United States Patent
Nojiri et al.

(10) Patent No.: US 9,507,067 B2
(45) Date of Patent: Nov. 29, 2016

(54) POLARIZING PLATE AND LIQUID CRYSTAL DISPLAY DEVICE INCLUDING THE SAME

(71) Applicant: FUJIFILM Corporation, Tokyo (JP)

(72) Inventors: Mayumi Nojiri, Kanagawa (JP); Nobutaka Fukagawa, Kanagawa (JP); Yu Naito, Kanagawa (JP); Naoya Shimoju, Kanagawa (JP); Aiko Yoshida, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 14/638,310

(22) Filed: Mar. 4, 2015

(65) Prior Publication Data

US 2015/0253479 A1    Sep. 10, 2015

(30) Foreign Application Priority Data

Mar. 5, 2014  (JP) ................... 2014-043362
Jan. 23, 2015  (JP) ................... 2015-011169

(51) Int. Cl.
G02B 5/30     (2006.01)
G02F 1/1335   (2006.01)

(52) U.S. Cl.
CPC ....... *G02B 5/3025* (2013.01); *G02F 1/133528* (2013.01)

(58) Field of Classification Search
CPC  G02B 5/3025; G02B 5/3033; G02B 5/3041; G02B 5/305; G02B 27/286; G02F 1/133528
USPC ...................................... 359/487.02, 487.01
See application file for complete search history.

(56) References Cited

U.S. PATENT DOCUMENTS

| | | | | |
|---|---|---|---|---|
| 4,166,871 A | * | 9/1979 | Schuler ................ | G02B 5/3033 359/487.02 |
| 5,130,057 A | * | 7/1992 | Saxe ....................... | G02B 1/04 252/584 |
| 2004/0066482 A1 | * | 4/2004 | Tanaka ............... | G02F 1/133634 349/141 |
| 2006/0227423 A1 | * | 10/2006 | Saiki .................... | G02B 5/3033 359/487.02 |
| 2007/0128461 A1 | * | 6/2007 | Tsai ........................ | C08J 5/18 428/532 |
| 2009/0219465 A1 | * | 9/2009 | Vesely ................... | G02B 27/26 349/96 |
| 2009/0290215 A1 | * | 11/2009 | Kwon .................. | G02B 5/3033 359/489.2 |
| 2012/0052197 A1 | * | 3/2012 | Sawada ..................... | C08J 5/18 427/163.1 |
| 2012/0058291 A1 | * | 3/2012 | Kitagawa ............. | G02B 5/3033 428/43 |
| 2012/0236408 A1 | * | 9/2012 | Kwon ..................... | H01J 11/44 359/483.01 |
| 2013/0160938 A1 | * | 6/2013 | Yasui ................... | G02B 5/3025 156/246 |
| 2014/0071379 A1 | * | 3/2014 | Takahashi ......... | G02F 1/133528 349/62 |
| 2014/0242300 A1 | | 8/2014 | Nojiri et al. | |
| 2015/0043070 A1 | * | 2/2015 | Kitagawa ................ | B29C 55/06 359/487.02 |
| 2016/0025910 A1 | * | 1/2016 | Sawada ................ | G02B 5/3033 359/487.02 |

FOREIGN PATENT DOCUMENTS

JP      2012-108202 A     6/2012

* cited by examiner

*Primary Examiner* — Frank Font

(74) *Attorney, Agent, or Firm* — Jean C. Edwards, Esq.; Edwards Neils LLC

(57) ABSTRACT

A polarizing plate includes at least: a polarizer layer containing a polyvinyl alcohol-based film dyed with iodine; and one or more other layers except for the polarizer layer, in which the polarizer layer contains a compound which has polyiodide ion $I_5^-$ reduction capability in iodide compound- and iodine-containing solutions, and at least one of the one or more other layers contain a compound which has polyiodide ion $I_5^-$ formation capability in an iodide compound-containing solution.

24 Claims, 1 Drawing Sheet

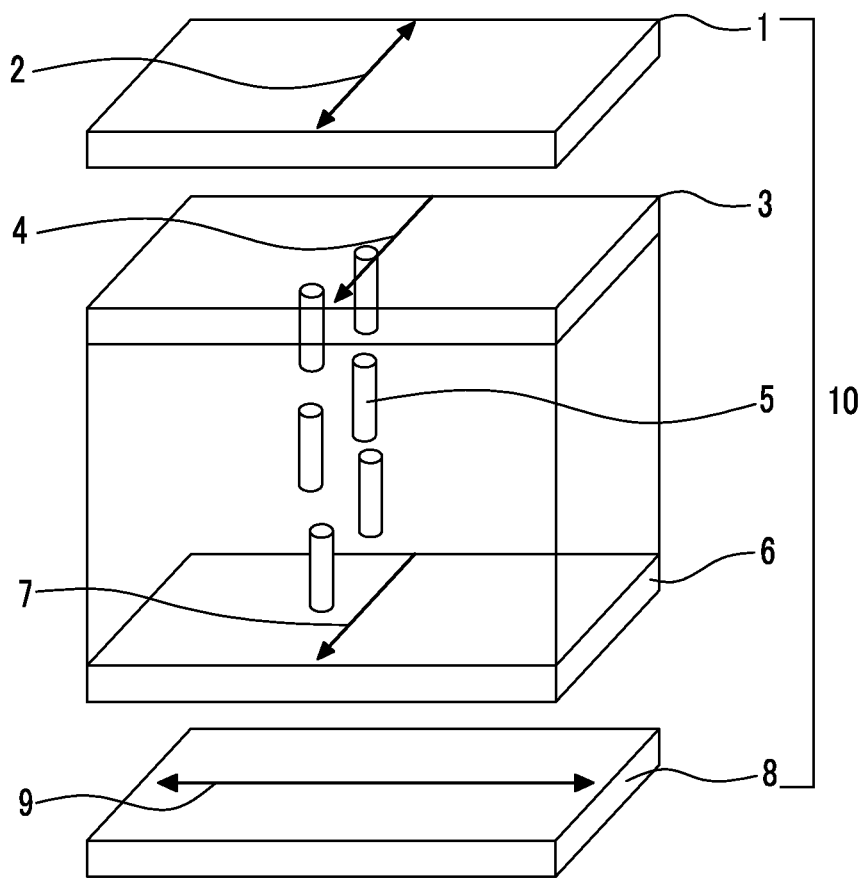

POLARIZING PLATE AND LIQUID CRYSTAL DISPLAY DEVICE INCLUDING THE SAME

CROSS-REFERENCE TO RELATED APPLICATION

The present application claims priority under 35 U.S.C. §119 to Japanese Patent Application No. 2014-43362, filed on Mar. 5, 2014 and Japanese Patent Application No. 2015-11169, filed on Jan. 23, 2015. Each of the above applications is hereby expressly incorporated by reference, in its entirety, into the present application.

BACKGROUND OF THE INVENTION

1. Field of the Invention

The present invention relates to a polarizing plate and a liquid crystal display device including the polarizing plate.

2. Description of the Related Art

The liquid crystal display device has been widely spread as a space-saving image display device with small power consumption, and its application has extended year after year.

A general configuration of the liquid crystal display device has polarizing plates on both sides of a liquid crystal cell. The polarizing plate has a role of passing only light on a polarization plane in a constant direction, and the performance of the liquid crystal display device depends largely on the performance of the polarizing plate. In general, the polarizing plate includes at least a polarizer (hereinafter, also denoted as a polarizer layer) formed of a polyvinyl alcohol-based film, on which iodine is adsorbed and aligned, and is constituted to arbitrarily have other layers such as a protective film (for example, refer to JP2012-108202A).

SUMMARY OF THE INVENTION

Chances of using the liquid crystal display device outdoors (for example, a large screen display installed outdoors, or a portable device) has increased in addition to indoors. For this reason, the polarizing plate constituting the liquid crystal display device is required to have high durability withstanding use in various environments including outdoors. In regard to this point, JP2012-108202A proposes inclusion of water-soluble antioxidant such as ascorbic acid in a polarizer layer in order to enhance durability of the polarizer layer in high temperature.

In JP2012-108202A, durability of the polarizer layer is evaluated in Example by a discoloration degree after the polarizer layer is left standing for a predetermined time in a dry atmosphere at 80° C. However, examples of the factors deteriorating the polarizer also include humidity in addition to temperature. For this reason, if it is possible to enhance durability of the polarizer in high temperature and high humidity, it is possible to provide a polarizer which can further withstand use in various environments.

An object of the present invention is to provide a polarizing plate which can show high durability in high temperature and high humidity.

The present inventors have extensive studied in order to achieve the above-described object, and as a result, they have newly found that the following polarizing plate has high durability even after being left in high temperature and high humidity (specifically, there is little deterioration in polarization performance), the polarizing plate including:

(A) a polarizing plate (hereinafter, denoted as "polarizing plate A") including at least:
a polarizer layer containing a polyvinyl alcohol-based film dyed with iodine; and
one or more other layers except for the polarizer layer,
in which the polarizer layer contains a compound which has polyiodide ion $I_5^-$ reduction capability in iodide compound- and iodine-containing solutions, and
in which at least one of the one or more other layers contain a compound which has polyiodide ion $I_5^-$ formation capability in an iodide compound-containing solution; or
(B) a polarizing plate (hereinafter, denoted as "polarizing plate B") including at least: a polarizer layer formed of a polyvinyl alcohol-based film dyed with iodine,
in which a compound, which has polyiodide ion $I_5^-$ formation capability in an iodide compound-containing solution, is applied to the polyvinyl alcohol-based film dyed with iodine, and the polarizer layer contains a compound which has polyiodide ion $I_5^-$ reduction capability in iodide compound- and iodine-containing solutions.

Hereinafter, the polarizing plate will be further described.

In general, the polyvinyl alcohol-based film dyed with iodine includes a polyiodide ion $I_3^-$ which is formed of a monoiodide ion and an iodine molecule, and a polyiodide ion $I_5^-$ which is formed of the polyiodide ion $I_3^-$ and the iodine molecule, in addition to a monoiodide ion $I^-$ and an iodine molecule $I_2$ which are contained in an iodine dye solution.

Meanwhile, JP2012-108202A proposes to use a water-soluble antioxidant such as ascorbic acid in order to suppress increase of a polyiodide ion $I_3^-$ in a process of producing a polarizer. It is assumed that the polarizer deteriorates due to an alignment disturbance of the polarizer caused by a complex formed of the polyiodide ion $I_3^-$ and a polyvinyl alcohol-based resin (hereinafter, also simply denoted as "polyvinyl alcohol" or "TVA").

In contrast, the present inventors have newly found that it is possible to suppress the deterioration in polarization performance of polarizing plates in high temperature and high humidity, using a "compound that suppresses formation of a polyiodide ion $I_5^-$" which is in a form where a polyiodide ion $I_5^-$ is further bonded to an iodine molecule $I_2$," and a "compound that promotes formation of a polyiodide ion $I_5^-$" which has properties contrary thereto in combination as the above-described polarizing plates A and B.

Although the details are not specified, the present inventors speculate as follows. In the polarizing plate A, the fact that the quantity of "complexes formed of $I_5^-$ and PVA" can be increased by the "compound that suppresses formation of a polyiodide ion $I_5^-$" reducing "isolated $I_5^-$ that does not form a complex with PVA" in a polarizer layer, and then, by the "compound that promotes formation of a polyiodide ion $I_5^-$", which has shifted from a separate layer, converting $I_3^-$ in a "complex which is formed by $I_3^-$ with PVA" into $I_5^-$ contributes to the suppression of deterioration in polarization performance thereof. In the polarizing plate B, the fact that the quantity of "complexes formed of $I_5^-$ and PVA" can be increased first by the "compound that suppresses formation of a polyiodide ion $I_5^-$" reducing "isolated $I_5^-$ that does not form a complex with PVA" in a polarizer layer, and then, by the "compound that promotes formation of a polyiodide ion $I_5^-$", which has been applied later, converting $I_3^-$ in a "complex which is formed by $I_3^-$ with PVA" into $I_5^-$ contributes to the suppression of deterioration in polarization performance thereof.

However, the above description is merely supposed by the present inventors and does not limit the present invention.

Hereinafter, $I_3^-$ and $I_5^-$ will be described as polyiodide ions, but a higher polyiodide ion may be included. In addition, the higher polyiodide ion may form a complex with PVA similarly to $I_3^-$ and $I_5^-$.

The above-described polyiodide ion $I_5^-$ formation capability in the iodide compound-containing solution is set to a value measured through the following method. The operation described below is performed in the atmosphere at room temperature (25° C.; and relative humidity of 40% RH) unless otherwise specified.

Hereinafter, a method of using potassium iodide as the iodide compound will be described as an example. However, iodide compounds other than potassium iodide, for example, lithium iodide, sodium iodide, zinc iodide, aluminum iodide, lead iodide, copper iodide, barium iodide, calcium iodide, tin iodide, and titanium iodide, may be used as the iodide compounds. The iodide compound-containing solution contains at least a monoiodide ion $I^-$ which is ionized from an iodide compound.

(1) Potassium iodide (KI) is added to a mixed solvent (water methanol=1:1 (volume ratio)) and the mixture is sufficiently stirred to prepare a potassium iodide solution at a concentration of 0.05 M.

A part of the prepared potassium iodide solution is used for preparing the following subject compound solution and the other part thereof is used as the following reference solution.

(2) 0.025 mmol of a subject compound for determining whether the subject compound has polyiodide ion $I_5^-$ formation capability in a potassium iodide solution is added to 5 mL of the above-described potassium iodide solution, and the mixture is sufficiently stirred and mixed. There is a case where the subject compound is completely dissolved in the potassium iodide solution and a case where a minute amount (for example, less than or equal to 5 mass % with respect to the total amount of the added subject compound) of the subject compound exists as insoluble matter. Alternately, in a case where there are many insoluble matter and it is difficult to accurately read absorbance in measuring the absorbance due to scattered light by the insoluble matter (that is, in a case where the subject compound has poor solubility in water and methanol), the measurement may be performed by replacing half of the amount of methanol with a solvent (hereinafter, also denoted as a third solvent) to which the subject compound has high solubility. In this case, a mixed solvent of water:methanol:third solvent=1:0.5:0.5 (volume ratio) is used as the mixed solvent. Ethanol, dimethylformamide (DMF), acetonitrile, acetone, and the like are preferable as the third solvent in terms of high compatibility with water or poor reactivity to an iodide ion or an iodine molecule, but the third solvent is not limited thereto. In addition, two or more kinds of solvents may be mixed and used as the third solvent.

A pressure resistance testing tube containing the subject compound solution prepared in this manner is left standing for 2 to 8 hours together with a pressure resistance testing tube containing a reference solution in a state of being immersed in a hot water bath at a liquid temperature of 60° C.

(3) Then, a part of the subject compound solution is collected from the pressure resistance testing tube taken out of the hot water bath and absorbance at a wavelength of 355 nm is measured by a spectrophotometer using a cell with a width (transmission distance of transmitted light) of 1 mm.

(4) In regard to the reference solution, a part of the reference solution is collected from the pressure resistance testing tube which has been left standing in the state of being immersed in the hot water bath for the same time as that of the pressure resistance testing tube containing the subject compound solution and absorbance is measured in the same manner as that of the subject compound solution.

(5) It is determined that a compound with absorbance exceeding 0.0 which has been measured in regard to the subject compound solution is the compound having polyiodide ion $I_5^-$ formation capability in a potassium iodide solution, and that a compound with absorbance of 0.0 which has been measured is a compound not having polyiodide ion $I_5^-$ formation capability in a potassium iodide solution.

However, in a case where a subject compound solution before being immersed in a hot water bath has absorption at a wavelength of 355 nm, a value, which is obtained by subtracting absorbance of the subject compound solution at a wavelength of 355 nm before being immersed in a hot water bath from the absorbance obtained through the above-described measurement, is used for determining whether the subject compound has polyiodide ion $I_5^-$ formation capability. In addition, in a case where absorbance of the reference solution at a wavelength of 355 nm exceeds 0.0, a value, which is obtained by subtracting the obtained absorbance of the reference solution from the obtained absorbance of the subject compound solution, is used for determining whether the subject compound has polyiodide ion $I_5^-$ formation capability in a potassium iodide solution.

The measurement of the absorbance using a spectrophotometer is compared with measurement results of a solution to be measured and measurement results of a blank solution. Measurement (hereinafter, referred to as a blank test) of the blank solution is performed using the same cell as that used for measuring the absorbance of the subject compound solution in order to eliminate or reduce an influence of the cell. The mixed solvent (containing neither a subject compound nor potassium iodide) used for preparing the subject compound solution is used as the blank solution.

The wavelength of 355 nm for the absorbance in the above-described measurement is a wavelength at which a polyiodide ion $I_5^-$ exhibits absorption. Accordingly, the absorbance exceeding 0.0 at a wavelength of 355 nm, that is, the solution having absorption at a wavelength of 355 nm, indicates that there is a polyiodide ion $I_5^-$ in the solution. This means that the subject compound has formed the polyiodide ion $I_5^-$ in the potassium iodide solution containing a monoiodide ion $I^-$. The present inventors consider that the possibility of forming $I_5^-$ in the potassium iodide solution containing a monoiodide ion means that the formation thereof has an action of promoting oxidation of $I^-$ (formation of $I_2$ thereby), formation of $I_3^-$ using $I_2$ and $I^-$, and formation of $I_5^-$ using $I_3^-$ and $I_2$. The present inventors speculate that the fact that the amount of complex formed of $I_5^-$ and PVA can be increased by the compound exhibiting the action of promoting the formation of $I_5^-$ in this manner contributes to maintenance of or improvement in polarization performance of a polarizer layer.

In contrast, the above-described polyiodide ion $I_5^-$ reduction capability in the iodide compound- and iodine-containing solutions is set to a value measured through the following method. The operation described below is performed in atmosphere at room temperature (25° C.; and RH 40%) unless otherwise specified. In addition, a method of using potassium iodide as the iodide compound will be described below as an example, but the iodide compounds described above may be used as the iodide compound, for example.

(1) Potassium iodide (KI) and iodine $I_2$ are added to a mixed solvent (water:methanol=4:6 (volume ratio)) and the mixture is sufficiently stirred to prepare a KI/$I_2$ solution (KI concentration: 96.4 mmol/L; $I_2$ concentration: 0.63 mmol/L).

A part of the prepared KI/$I_2$ solution is used for preparing the following subject compound solution and the other part thereof is used as the following reference solution.

(2) A subject compound for determining whether the subject compound has polyiodide ion $I_5^-$ reduction capability in a KI/$I_2$ solution is added to the above-described KI/$I_2$ solution so as to obtain a concentration of 0.63 mmol/L, and the mixture is sufficiently stirred and mixed. A beaker containing the subject compound solution prepared in this manner and a beaker containing a reference solution are left standing for 48 hours at room temperature without controlling temperature and humidity. The starting time of the standing time is a time point at which the subject compound is added to the KI/$I_2$ solution.

(3) Then, a part of the subject compound solution is collected from the beaker and then diluted to 10 times with the mixed solvent (water:methanol=4:6 (volume ratio)), and absorbance of diluted solution at a wavelength of 355 nm is measured by a spectrophotometer using a cell with a width (transmission distance of transmitted light) of 1 cm.

(4) In regard to the reference solution, absorbance is measured in the same manner as that of the subject compound solution.

(5) It is determined that the subject compound is a compound having polyiodide ion $I_5^-$ reduction capability in iodide compound- and iodine-containing solutions when the absorbance ($A_{sample}$) of the subject compound solution at a wavelength of 355 nm falls below the absorbance ($A_{ref}$) of the reference solution at a wavelength of 355 nm, that is, when $A_{sample} < A_{ref}$.

In addition, when a subject compound solution of which the absorbance ($A_{sample}$) at a wavelength of 355 nm which is obtained through the above-described measurement does not fall below the absorbance ($A_{ref}$) of the reference solution at a wavelength of 355 nm, the absorbance thereof is measured again after eliminating residual oxygen in the solution by ventilating an inert gas through the solution. When the resulting absorbance ($A_{sample}$) falls below the absorbance ($A_{ref}$) of the reference solution at a wavelength of 355 nm, it is determined that the subject compound is a compound having polyiodide ion $I_5^-$ reduction capability in iodide compound- and iodine-containing solutions. The inert gas can be vented by bubbling a nitrogen gas for, for example, 10 minutes to 20 minutes. The solution is sealed and stored so as not to be brought into contact with oxygen in the air while being left standing for 48 hours at room temperature without controlling the temperature after the bubbling.

When the subject compound solution immediately after the preparation has absorption at a wavelength of 355 nm, a value, which is obtained by subtracting the absorbance of the subject compound solution at a wavelength of 355 nm before being left standing at room temperature, for example, within 10 minutes from the above-described starting time from the absorbance obtained through the above-described measurement, is used for determining whether the subject compound has polyiodide ion $I_5^-$ reduction capability.

As described above, the measurement of the absorbance using a spectrophotometer is compared with measurement results of a solution to be measured and measurement results of a blank solution. Measurement (blank test) of the blank solution is performed using the same cell as that used for measuring the absorbance of the subject compound solution in order to eliminate or reduce an influence of the cell. The mixed solvent (not containing a subject compound, an iodide compound, and an iodine) used for preparing the subject compound solution is used as the blank solution.

In the KI/$I_2$ solution, $I_3^-$ is formed by $I^-$ and $I_2$ which are generated by ionization of KI, and $I_5^-$ is formed by the $I_3^-$ and $I_2$. Accordingly, less absorption (low absorbance at a wavelength of 355 nm) due to $I_5^-$ than the reference solution means that the subject compound reduced $I_5^-$ in the KI/$I_2$ solution. The present inventors speculate that, the fact that the compound, which exhibits the action of reducing $I_5^-$, reduces isolated $I_5^-$ which does not form a complex with PVA, and then, the above-described compound having polyiodide ion $I_5^-$ formation capability forms ion $I_5^-$, contributes to maintenance of the polarization performance of the polarizer layer.

In an embodiment, in the polarizing plate A, the above-described one or more other layers may contain a polarizing plate protective film, and the polarizing plate protective film may contain the compound having polyiodide ion $I_5^-$ formation capability.

In an embodiment, the compound having polyiodide ion $I_5^-$ formation capability may contain a carbon atom which is bonded to an electron withdrawing group through a single bond (while excluding a carbon atom which are bonded to any other carbon atom through a double bond).

In an embodiment, the compound having polyiodide ion $I_5^-$ formation capability may contain a carbon atom which is bonded to each of two electron withdrawing groups through a single bond (while excluding a carbon atom which is bonded to any other carbon atom through a double bond).

In an embodiment, the electron withdrawing group may be a carbonyl group.

In an embodiment, the compound having polyiodide ion $I_5^-$ formation capability may contain one or more hetero atoms.

In an embodiment, the compound having polyiodide ion $I_5^-$ formation capability may have a ring structure containing the above-described carbon atom.

In an embodiment, the ring structure may be a heterocyclic ring.

In an embodiment, the ring structure may be a 5- or 6-membered ring.

In an embodiment, the ring structure may be a nitrogen-containing heterocyclic ring.

In an embodiment, the compound having the polyiodide ion $I_5^-$ reduction capability may be at least one kind selected from the group consisting of ascorbic acid, erythorbic acid, chlorogenic acid, citric acid, rosmarinic acid, thiosulfuric acid, sulfurous acid, and salts thereof.

Another embodiment of the present invention relates to a liquid crystal display device including the above-described polarizing plate.

According to the embodiments of the present invention, it is possible to provide the polarizing plate which can exhibit favorable polarization performance even after being left in high temperature and high humidity, and the liquid crystal display device provided with the polarizing plate.

BRIEF DESCRIPTION OF THE DRAWING

FIG. 1 is a schematic view showing an example of a liquid crystal display device according to an embodiment of the present invention.

DESCRIPTION OF THE PREFERRED EMBODIMENTS

The following description will be made based on a representative embodiment of the present invention, but the present invention is not limited to such an embodiment. The numerical range represented by "~" in the present invention and the present specification indicates a range including numerical values denoted before and after "~" as a lower limit value and an upper limit value.

In addition, in the notation of groups (atomic groups) in the present invention and the present specification, a group without notation of substitution and non-substitution includes a group which does not have a substituent group and a group which has a substituent group. For example, an "alkyl group" includes an alkyl group (substituted alkyl group) which has a substituent group as well as an alkyl group (unsubstituted alkyl group) which does not have a substituent group.

[Polarizing Plate]

A polarizing plate A according to an embodiment of the present invention has at least a polarizer layer formed of a polyvinyl alcohol-based film dyed with iodine; and one or more other layers except for the polarizer layer. The polarizer layer contains a compound which has polyiodide ion $I_5^-$ reduction capability in iodide compound- and iodine-containing solutions (hereinafter, simply denoted as "compound which has polyiodide ion $I_5^-$ reduction capability"). The one or more other layers other than the polarizer layer contain a compound which has polyiodide ion $I_5^-$ formation capability in an iodide compound-containing solution (hereinafter, simply denoted as "compound which has polyiodide ion $I_5^-$ formation capability").

A polarizing plate B according to another embodiment of the present invention has at least a polarizer layer formed of a polyvinyl alcohol-based film dyed with iodine. The polarizer layer is a polarizer layer which contains a compound having polyiodide ion $I_5^-$ reduction capability, and is formed by applying a compound having polyiodide ion $I_5^-$ formation capability to the polyvinyl alcohol-based film dyed with iodine.

Hereinafter, the polarizing plate A and the polarizing plate B will be further described in detail. Unless otherwise specified, the description is applied to both of the polarizing plate A and the polarizing plate B. An embodiment of the polarizing plate of the present invention includes polarizing plate included in both of the polarizing plate A and polarizing plate B.

<Configuration of Polarizing Plate>

The above-described polarizing plate has at least a polarizer layer formed of a polyvinyl alcohol-based film dyed with iodine. The polarizer layer contains a polyvinyl alcohol-based film dyed with iodine. A polarizing plate A has one or more other layers in addition to the polarizer layer. Examples of the other layers include a polarizing plate protective film and an adhesive agent. Meanwhile, a polarizing plate B can have one or more polarizing plate protective films, an adhesive layer, and the like as arbitrary layers. The other layers will be described later.

The polarizer layer included in the above-described polarizing plate is formed of a polyvinyl alcohol-based film dyed with iodine. In general, the iodine dyeing is performed by bringing the polyvinyl alcohol-based film into contact with an aqueous solution which contains iodine $I_2$ and iodide compound (for example, a compound which contains potassium iodide KI containing monoiodide ion $I^-$, or a polyiodide ion such as $I_3^-$, $I_5^-$, or the like). The contact is performed, for example, by immersing the polyvinyl alcohol-based film in the above-described aqueous solution. The details will be described later. In general, the production process of the polarizer layer includes iodine dyeing, a crosslinking process, and a stretching process. The details thereof will also be described later. Alternately, a polyvinyl alcohol-based film dyed with iodine may be produced by peeling the polyvinyl alcohol-based film from a resin base material after performing the above-described various processes on the polyvinyl alcohol-based film formed on the resin base material. It is possible to form the polyvinyl alcohol-based film on the resin base material by coating the surface of the resin base material with a composition containing a polyvinyl alcohol-based resin. The thickness of the polarizer layer obtained in this manner is, for example, within a range of 0.1 μm to 100 μm and preferably within a range of 1 μm to 25 μm in view of polarization performance.

<Compound Having Polyiodide Ion $I_5^-$ Formation Capability>

A polarizing plate A contains a compound having polyiodide ion $I_5^-$ formation capability in a polarizer layer. In contrast, a polarizing plate B has a polarizer layer which is obtained by applying a compound, which has polyiodide ion $I_5^-$ formation capability, to a polyvinyl alcohol-based film which contains a compound having polyiodide ion $I_5^-$ reduction capability and is dyed with iodine. The compound having polyiodide ion $I_5^-$ formation capability may be in any form of a hydrate, a solvate, and a salt.

Hereinafter, the compound having polyiodide ion $I_5^-$ formation capability will be further described in detail.

The present inventors consider that, as one speculated mechanism, the compound having polyiodide ion $I_5^-$ formation capability, which is evaluated through the above-described method, is oxidized due to oxygen to be changed into an oxidatively active compound, and thus contributes to exhibition of the polyiodide ion $I_5^-$ formation capability. Specifically, the present inventors consider that the oxidatively active compound having an action of promoting a reaction in which $I_2$ is formed due to a monoiodide ion being oxidized contributes to the exhibition of the polyiodide ion $I_5^-$ formation capability. Absorbance of the compound having polyiodide ion $I_5^-$ formation capability which is obtained through the above-described method is greater than 0.0, preferably greater than or equal to 0.1, more preferably greater than or equal to 0.5, and still more preferably greater than or equal to 1.0. The above-described absorbance is, for example, preferably less than or equal to 3.0 and more preferably less than or equal to 2.5. It is considered that the polyiodide ion $I_5^-$ in the polyvinyl alcohol-based film can be more increased as the above-described absorbance is higher, and thus, the upper limit is not particularly limited. In the above-described method, the standing time for the pressure resistance testing tube in the hot water bath is 2 hours to 8 hours. However, it is preferable if a compound shows absorbance exceeding 0.0 in a shorter period of time. From this point, it is particularly preferable if a compound shows absorbance exceeding 0.0 in a standing time of 2 hours.

Examples of a partial structure which is considered to contribute to the exhibition of the above-described polyiodide ion $I_5^-$ formation capability include a structure in which an electron withdrawing group and a carbon atom are bonded to each other through a single bond. Accordingly, the compound having polyiodide ion $I_5^-$ formation capability preferably includes the above-described structure as the partial structure. In one preferred embodiment, the above-described carbon atoms are respectively bonded to two electron withdrawing groups through a single bond. In another preferred embodiment, the carbon atom which is bonded to the electron withdrawing group through a single bond is included in a ring structure. In the another preferred embodiment, in regard to the carbon atom bonded to the electron withdrawing group through a single bond, the number of hydrogen atoms bonded to the carbon atom through a single bond is preferably 1. A group of which a σp value of Hammett's rule is greater than 0 is preferable as the electron withdrawing group. In regard to the details of the electron withdrawing group, it is possible to refer to the description regarding General Formula (1) to be described later. In an embodiment, the electron withdrawing group is preferably a carbonyl group (—C(=O)—). However, it is preferable that a carbon atom, which is bonded to the carbonyl group through a single bond, is not bonded to another carbon atom through a double bond. It is preferable that the above-described carbonyl group is not bonded to the carbonyl group through a single bond. Divalent electron withdrawing groups such as —$SO_2$—, —SO—, —P(=O)(ORb)O—, and the like are preferable as the electron withdrawing group. Here, Rb represents a substituent group. Examples of the substituent group include various substituent groups to be exemplified later. The compound having polyiodide ion $I_5^-$ formation capability is preferably included in the above-described one or more preferred embodiments and more preferably in the above-described two or more preferred embodiments. That is, it is preferable that the compound having polyiodide ion $I_5^-$ formation capability is included in many more preferred embodiments.

The compound having polyiodide ion $I_5^-$ formation capability preferably includes a specific carbon atom. The "specific carbon atom" indicates either (1) a carbon atom which is bonded to an electron withdrawing group through a single bond while not being bonded to any other carbon atom through a double bond, or (2) a carbon atom which is bonded to each of two electron withdrawing groups through a single bond while not being bonded to any other carbon atom through a double bond. Above (1) is a carbon atom which is bonded to an electron withdrawing group through a single bond (while excluding a carbon atom which is bonded to any other carbon atom through a double bond). Above (2) is a carbon atom which is bonded to each of two electron withdrawing groups through a single bond (while excluding a carbon atom which is bonded to any other carbon atom through a double bond).

Among compounds included in the above-described one or more preferred embodiments, there is also a compound which does not have polyiodide ion $I_5^-$ formation capability. Whether or not a compound has polyiodide ion $I_5^-$ formation capability is determined through the above-described method.

The compound having polyiodide ion $I_5^-$ formation capability may be a cyclic compound or a straight-chain compound, and may have a branched structure. In regard to the cyclic compound, the above-described electron withdrawing group is preferably included in the ring structure.

The compound having the above-described preferred partial structure still more preferably contains one or more hetero atoms. The number of hetero atoms contained in one molecule is, for example, 1 to 10 and preferably 1 to 6. Examples of the hetero atoms include a nitrogen atom, a sulfur atom, an oxygen atom, and a phosphorus atom. Two or more kinds of different hetero atoms may be contained in combination in one molecule. In a case where a hetero atom is included in the ring structure, a nitrogen atom, a sulfur atom, and an oxygen atom are preferable as the hetero atom and a nitrogen atom is more preferable as the hetero atom.

That is, the compound having polyiodide ion $I_5^-$ formation capability preferably has a heterocyclic ring as the ring structure and more preferably has a nitrogen-containing heterocyclic ring. The above-described heterocyclic ring is preferably 5- or 6-membered ring. The hetero atom included in the heterocyclic ring is preferably at least any one of a nitrogen atom and an oxygen atom, more preferably at least one nitrogen atom, and most preferably formed of a nitrogen atom. In a case where an oxygen atom is included in a molecule as the hetero atom, in an embodiment, the oxygen atom constitutes a carbonyl group (—C(=O)—) which is bonded to the above-described carbon atom through a single bond. That is, examples of more preferred partial structure include a nitrogen-containing heterocyclic ring containing the above-described carbonyl group and a carbon atom which is bonded to the carbonyl group through a single bond. Examples of still more preferred partial structure include a nitrogen-containing heterocyclic ring containing carbon atoms which are respectively bonded to two carbonyl groups through a single bond.

According to the above-described one speculated mechanism, it is considered that the compound having polyiodide ion $I_5^-$ formation capability is oxidized due to oxygen to be converted into an oxidatively active compound in a polarizing plate, and then, is finally changed into an oxidant by oxidizing a monoiodide ion $I^-$. Accordingly, the polarizing plate according to an embodiment of the present invention also includes the polarizing plate containing the oxidant of the compound having polyiodide ion $I_5^-$ formation capability. In addition, according to the above-described speculated mechanism, a compound which has properties of being easily converted into the oxidatively active compound is also preferable as the compound having polyiodide ion $I_5^-$ formation capability. Examples of the preferred compound from this point include unsaturated fatty acid such as linoleic acid.

Hereinafter, a specific embodiment of the compound having polyiodide ion $I_5^-$ formation capability will be described, but the present invention is not limited to the following specific embodiment.

(Compound Represented by General Formula (1))

General Formula (1)

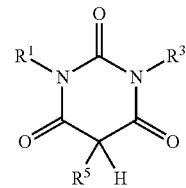

(in General Formula (1), $R^1$ and $R^3$ each independently represent a hydrogen atom, a 1-20C straight-chain alkyl group, a 3-20C branched alkyl group, a 3-20C cycloalkyl group, a 2-20C alkenyl group, or a 6-20C aromatic group, and $R^5$ represents a substituent group.)

Preferred ranges of $R^1$ and $R^3$ in General Formula (1) will be described.

In the above-described 1-20C straight-chain alkyl group or the 3-20C branched alkyl group, a 1-10C straight-chain alkyl group or a 3-20C branched alkyl group is preferable, a 1-5C straight-chain alkyl group or a 3-5C branched alkyl group is more preferable, a 1-3C straight-chain alkyl group is still more preferable, and a methyl group or an ethyl group is particularly preferable.

In the above-described 3-20C cycloalkyl group, a 3-10C cycloalkyl group is preferable and a 4-8C cycloalkyl group is more preferable. Specific examples of the cycloalkyl group include a cyclopropyl group, a cyclopentyl group, and a cyclohexyl group, and a cyclohexyl group is particularly preferable. The cycloalkyl group represents a cyclic alkyl group.

In the above-described 2-20C alkenyl group, a 2-10C alkenyl group is preferable and a 2-5C alkenyl group is more preferable.

The above-described 6-20C aromatic group may be an aromatic hydrocarbon group or an aromatic heterocyclic group, but an aromatic hydrocarbon group is preferable. As the aromatic hydrocarbon group, a phenyl group and a naphthyl group are preferable and a phenyl group is more preferable.

$R^1$ and $R^3$ may have a substituent group. The substituent group is not particularly limited, but examples thereof include alkyl groups (preferably with 1 to 10 carbon atoms, for example, a methyl group, an ethyl group, an isopropyl group, a t-butyl group, a pentyl group, a heptyl group, a 1-ethylpentyl group, a benzyl group, a 2-ethoxyethyl group, and a 1-carboxymethyl group); alkenyl groups (preferably with 2 to 20 carbon atoms, for example, a vinyl group, an allyl group, and an oleyl group); alkynyl groups (preferably with 2 to 20 carbon atoms, for example, an ethynyl group, a butadiynyl group, and a phenylethynyl group); cycloalkyl groups (preferably with 3 to 20 carbon atoms, for example, a cyclopropyl group, a cyclopentyl group, a cyclohexyl group, and a 4-methyl cyclohexyl group); aryl groups (preferably with 6 to 26 carbon atoms, for example, a phenyl group, a 1-naphthyl group, a 4-methoxyphenyl group, a 2-chlorophenyl group, and a 3-methylphenyl group); heterocyclic groups (heterocyclic groups with 0 to 20 carbon atoms are preferable; a ring-constituting hetero atom is preferably an oxygen atom, a nitrogen atom, and a sulfur atom and may be subjected to ring condensation with a benzene ring or a hetero ring which is a 5- or 6-membered ring; the ring may be a saturated ring, an unsaturated ring, or an aromatic ring; and examples thereof include a 2-pyridyl group, a 4-pyridyl group, a 2-imidazolyl group, a 2-benzimidazolyl group, a 2-thiazolyl group, and a 2-oxazolyl group); alkoxy groups (preferably with 1 to 20 carbon atoms, for example, a methoxy group, an ethoxy group, an isopropyloxy group, and a benzyloxy group); and aryloxy groups (preferably with 6 to 26 carbon atoms, for example, a phenoxy group, a 1-naphthyloxy group, a 3-methylphenoxy group, and a 4-methoxyphenoxy group);

alkylthio groups (preferably with 1 to 20 carbon atoms, for example, a methylthio group, an ethylthio group, an isopropylthio group, and a benzylthio group); arylthio groups (preferably with 6 to 26 carbon atoms, for example, a phenylthio group, a 1-naphthylthio group, a 3-methylphenylthio group, and a 4-methoxyphenylthio group); acyl groups (which include an alkylcarbonyl group, an alkenylcarbonyl group, an arylcarbonyl group, and a heterocyclic carbonyl group, and preferably have 20 or fewer carbon atoms, and examples thereof include an acetyl group, a pivaloyl group, an acryloyl group, a methacryloyl group, a benzoyl group, and a nicotinoyl group); aryloyl alkyl groups; alkoxycarbonyl groups (preferably with 2 to 20 carbon atoms, for example, an ethoxycarbonyl group and a 2-ethylhexyloxy carbonyl group); aryloxycarbonyl groups (preferably with 7 to 20 carbon atoms, for example, a phenyloxycarbonyl group and a naphthyloxycarbonyl group); amino groups (which include an amino group, an alkylamino group, an arylamino group, and a heterocyclic amino group, and preferably have 0 to 20 carbon atoms, and examples thereof include an amino group, an N,N-dimethylamino group, an N,N-diethylamino group, an N-ethylamino group, an anilino group, a 1-pyrrolidinyl group, a piperidino group, and a morpholinyl group); sulfonamide groups (preferably with 0 to 20 carbon atoms, for example, an N,N-dimethyl sulfonamide group and an N-phenyl sulfonamide group); sulfamoyl groups (preferably with 0 to 20 carbon atoms, for example, an N,N-dimethylsulfamoyl group and a N-phenylsulfamoyl group); acyloxy groups (preferably with 1 to 20 carbon atoms, for example, an acetyloxy group and a benzoyloxy group); carbamoyl groups (preferably with 1 to 20 carbon atoms, for example, an N,N-dimethylcarbamoyl group and an N-phenylcarbamoyl group); acylamino groups (preferably with 1 to 20 carbon atoms, for example, an acetylamino group, an acryloylamino group, a benzoylamino group, and a nicotinamide group); cyano groups; hydroxyl groups; mercapto groups; or halogen atoms (for example, a fluorine atom, a chlorine atom, a bromine atom, and an iodine atom). The substituent groups which can be possessed by $R^1$ and $R^3$ may further have the above-described substituent groups.

Among the above-described substituent groups which each group of $R^1$ and $R^3$ may have, an alkyl group, an aryl group, an alkoxy group, and an acyl group are preferable.

$R^5$ represents a substituent group. The substituent group is not particularly limited, and examples thereof include substituent groups which are indicated as the substituent groups which $R^1$ and $R^3$ have. $R^5$ is preferably an alkyl group (preferably, a 1-5C alkyl group), an aryl group, and an aralkyl group, more preferably an aryl group or an aralkyl group, and still more preferably a phenyl group or a benzyl group.

In the present invention, particularly, $R^5$ is still more preferably "substituent groups which have an aromatic ring and exhibit a polar effect". These groups may be further substituted with substituent groups. It is preferable that the substituent groups, represented by $R^5$, which have an aromatic ring and exhibit a polar effect have a structure exhibiting the polar effect in order to capture a radical and to contribute to stabilization. A substituent group having an effect showing polarization can be used as the structure exhibiting the polar effect, but $R^5$ is preferably the "substituent groups which have an aromatic ring and exhibit a polar effect".

As such "substituent groups which have an aromatic ring and exhibit a polar effect", a 6-20C aromatic group or a 7-20C aralkyl group is preferable, a 6-14C aromatic group or a 7-15C aralkyl group is more preferable, and a 6-10C aromatic group or a 7-11C aralkyl group is still more preferable. Here, the number of carbon atoms indicates the total number of carbon atoms. The aralkyl group is a compound in which an aryl group is substituted with the alkyl group. Among aralkyl groups, an aralkyl group in which one or two aryl groups are substituted with the alkyl group (in a case where two aryl groups are substituted, the aryl groups are preferably substituted with an identical carbon atom) is preferable. Examples of the substituent groups which have an aromatic ring and exhibit a polar effect include a phenyl group, a naphthyl group, an anthracenyl group, a benzyl group, and a diphenylmethyl group.

Examples of $R^5$ include phenyl group, a p-chlorophenyl group, a p-toluyl group, a benzyl group, an ethyl phenyl group, an m-toluyl group, a p-methoxyphenyl group, a p-trifluoromethylphenyl group, a p-methylbenzyl group, a diphenylmethyl group, and a methyl benzoyl phenyl methyl group.

Among the compounds represented by General Formula (1), examples of the preferred compounds are as follows.

At least one of $R^1$, $R^3$, and $R^5$ has a substituent group exhibiting a polar effect A compound in which any one of $R^1$ and $R^3$ is an aralkyl group The aralkyl group is a compound in which an aryl group is substituted with an alkyl group, and among aralkyl groups, an aralkyl group in which one or two aryl group is substituted with the alkyl group (in a case where two aryl groups are substituted, the aryl groups are preferably substituted with an identical carbon atom) is preferable. Furthermore, an aralkyl group in which an aryl group and an acyl group (preferably an aryloyl group) are substituted with an alkyl group is preferable.

A compound in which any one of $R^1$ and $R^3$ is a group including a cycloalkyl group, and preferably, the group including the cycloalkyl group is the cycloalkyl group A compound in which $R^1$ and $R^3$ are hydrogen atoms, and particularly, a compound in which $R^1$ and $R^3$ are hydrogen atoms and $R^5$ is an 1-3C alkyl group As one preferred embodiment of the compound represented by General Formula (1), at least one of $R^1$, $R^3$, and $R^5$ is a water-soluble group or includes a water-soluble functional group, or both of $R^1$ and $R^3$ are hydrogen atoms. The compound represented by General Formula (1) according to the above-described an embodiment is excellent in compatibility with polyvinyl alcohol constituting the polarizer layer, which is preferable.

The water-soluble functional group is a group contributing to water solubility of the compound represented by General Formula (1). Specific examples of the water-soluble functional group which the compound represented by General Formula (1) can have include a sulfo group (or a salt thereof), a carboxy group (or its salt), a hydroxy group, a mercapto group, an amino group, an ammonio group, a sulfonamide group, an acylsulfamoyl group, a sulfonylsulfamoyl group, an active methine group, or substituent groups including these groups, and preferred examples thereof include groups such as a sulfo group (or a salt thereof), a carboxy group (or a salt thereof), a hydroxy group, and an amino group.

A carboxyl group, the sulfonamide group, and the sulfo group may be in a state of a salt. Examples of counter ions forming a salt include an ammonium ion, an alkali metal ion (for example, a lithium ion, a sodium ion, and a potassium ion), and an organic cation (for example, a tetramethylammonium ion, a tetramethylguanidinium ion, and a tetramethylphosphonium ion). Among the counter ions, an alkali metal salt is preferable.

In addition, examples of the group which imparts water solubility to the compound represented by General Formula (1) include an embodiment in which both of $R^1$ and $R^3$ are hydrogen atoms. This is because the water solubility of the compound represented by General Formula (1) is increased with such a configuration.

In addition, the compound represented by General Formula (1) may be used in a form of a hydrate, a solvate, or a salt. In the present invention, the hydrate may contain an organic solvent and the solvate may contain water. That is, the "hydrate" and the "solvate" contain a mixed solvate which contain all of the water and the organic solvent.

Examples of the solvent contained in the solvate include any general organic solvents. Specific examples thereof include alcohols (for example, methanol, ethanol, 2-propanol, 1-butanol, 1-methoxy-2-propanol, and t-butanol), esters (for example, and ethyl acetate), hydrocarbons (either aliphatic hydrocarbon or aromatic hydrocarbon, for example, toluene, hexane, and heptane), ethers (for example, diethyl ether and tetrahydrofuran), nitriles (for example, acetonitrile), ketones (for example, acetone, and 2-butanone). A solvate of alcohol is preferable, and methanol, ethanol, 2-propanol, and 1-butanol are more preferable. These solvents may be reaction solvents which are used when synthesizing the compound represented by General Formula (1) in the present invention or solvents which are used during crystallization and purification after the synthesis, or may be a combination thereof.

In addition, two or more kinds of solvents may be included at the same time, or water and a solvent (for example, water and alcohol (for example, methanol, ethanol, and t-butanol)) may be included.

An acid addition salt formed by an inorganic or organic acid is included as the salt. Examples of the inorganic acid include hydrohalic acids (hydrochloric acid and hydrobromic acid), sulfuric acid, and phosphoric acid. In addition, examples of the organic acid include acetic acid, trifluoroacetic acid, oxalic acid, citric acid, alkane sulfonic acid (methane sulfonic acid), and aryl sulfonic acid (benzene sulfonic acid, 4-toluene sulfonic acid, and 1,5-naphthalene disulfonic acid).

In addition, examples of the salt include a salt which is formed when an acidic moiety existing in a parent compound is substituted by a metal ion (for example, alkali metal salts such as sodium or potassium salts, alkaline earth metal salts such as calcium or magnesium salts, an ammonium salt, an alkali metal ion, an alkaline earth metal ion, or an aluminum ion) or is adjusted with organic bases (ethanolamine, diethanolamine, triethanolamine, morpholine, and piperidine), but the present invention is not limited thereto. Among these, a sodium salt and a potassium salt are preferable.

In the form of the salt of the compound represented by General Formula (1), for example, in the case of the sodium salt, there are tautomers as shown in the following example. However, in the present invention, these are not distinguished from each other and are regarded as the same as each other. In the specific example, only one of these configurations is described.

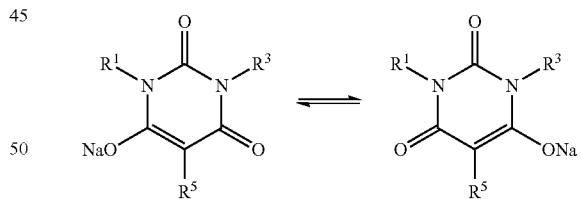

The degree of hydrophilicity of the compound represented by General Formula (1) can be represented as a C Log P value. P in C Log P represents a distribution coefficient in an n-octanol-water system and can be measured using n-octanol and water. These distribution coefficients can be obtained as C Log P values of estimation values using a C Log P value estimation program (C Log P program incorporated in PC models of Daylight Chemical Information Systems, Inc.). The C Log P value is preferably within a range of −8.0 to 12.0, more preferably within a range of −5.0 to 10.0, and still more preferably within a range of −5.0 to 8.0.

Hereinafter, specific examples of the compound represented by General Formula (1) or the like will be shown, but the present invention is not limited thereto. In the compounds exemplified below, Me represents a methyl group.
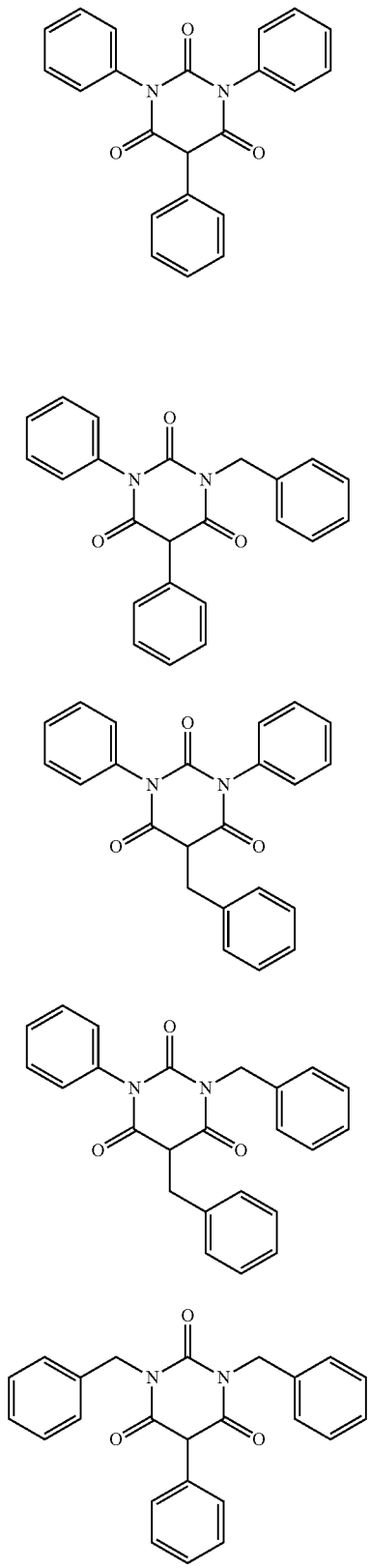
A-1
A-2
A-3
A-4
A-5
-continued
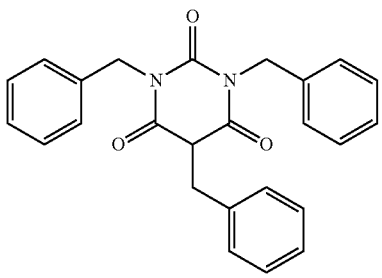
A-6
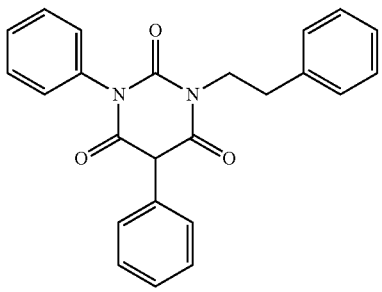
A-7
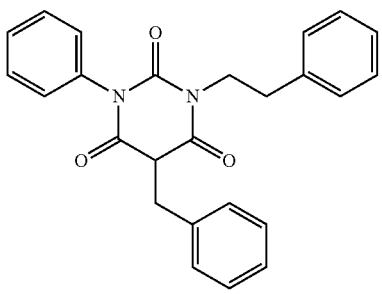
A-8
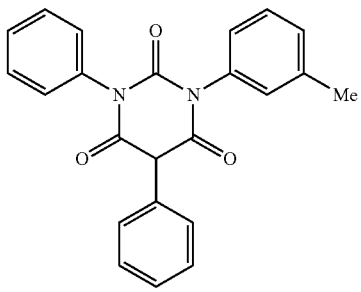
A-9
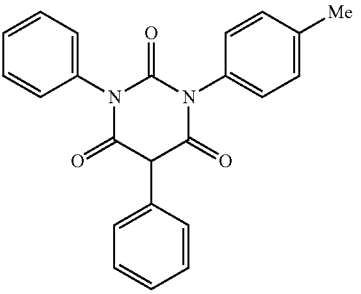
A-10

A-11
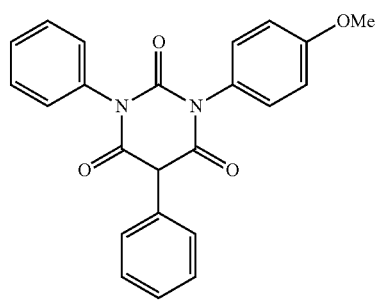
A-12
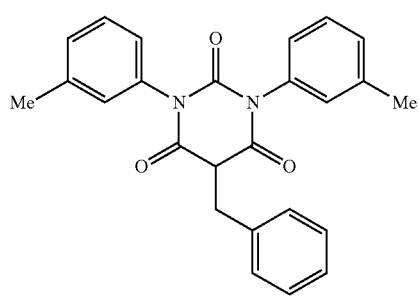
A-13
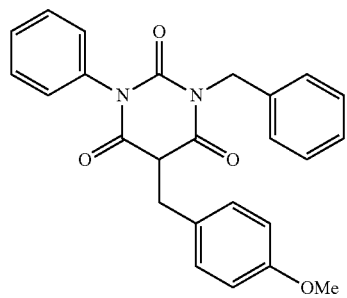
A-14
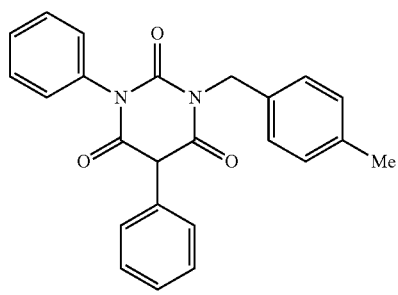
A-15
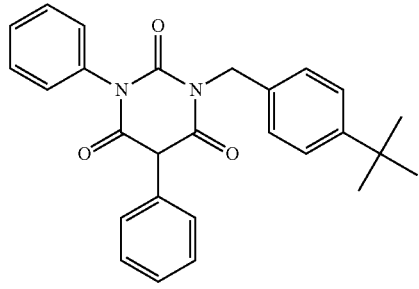
A-16
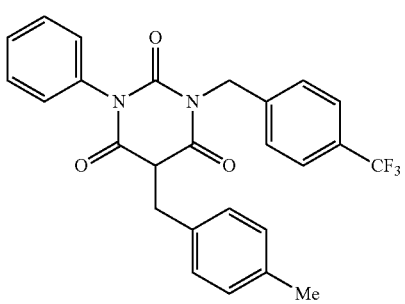
A-17
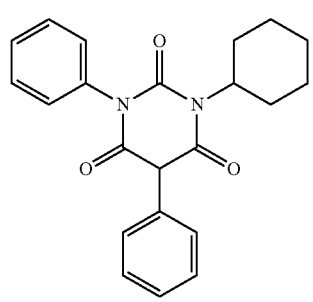
A-18
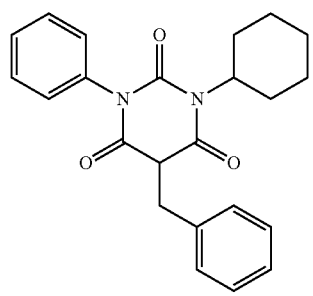
A-19
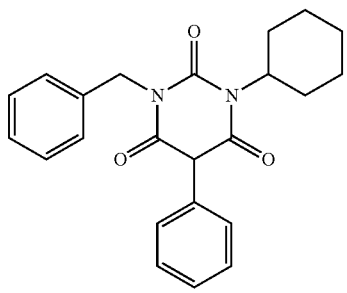
A-20
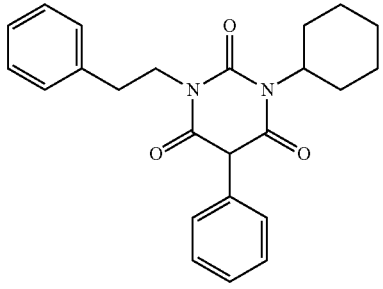

-continued
A-21
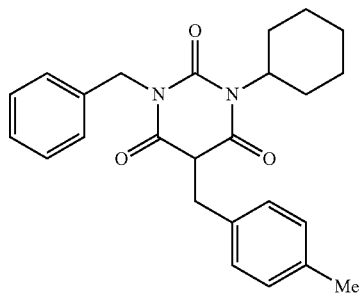
A-22
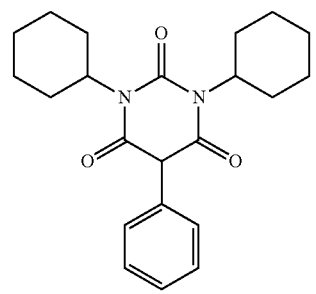
A-23
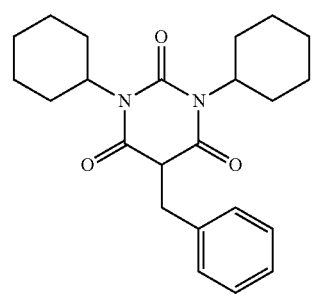
A-24
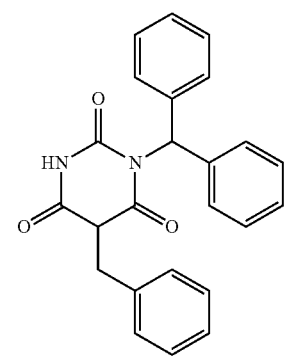
A-25
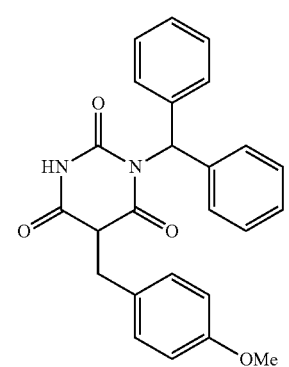
-continued
A-26
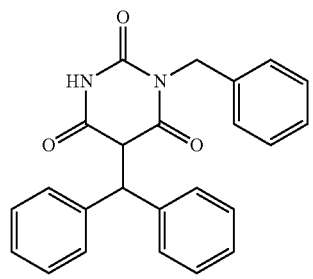
A-27
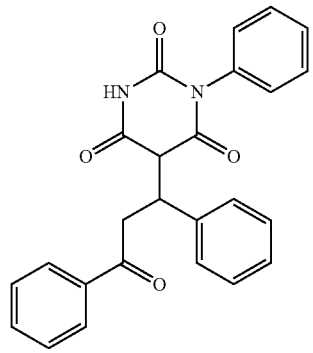
A-28
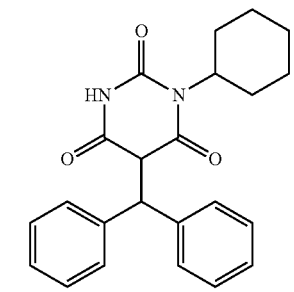
A-29
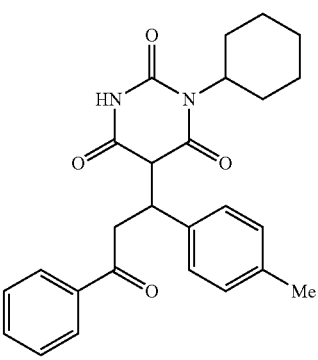
A-30
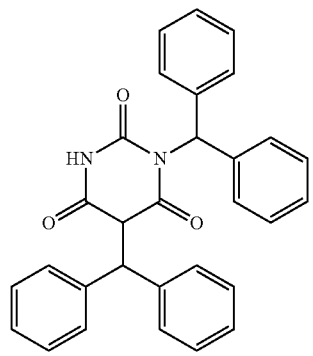

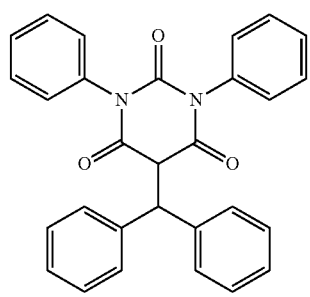 A-31
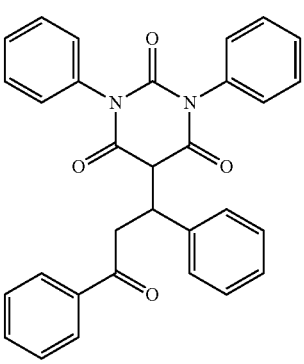 A-32
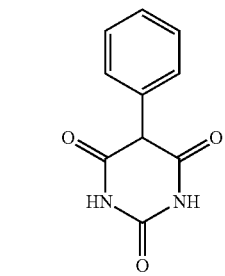 (A-33)
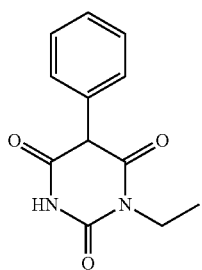 (A-34)
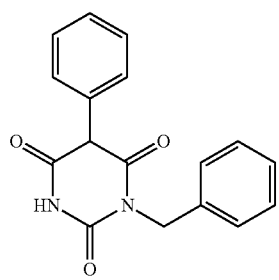 (A-35)
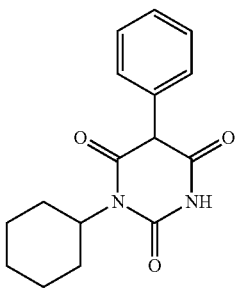 (A-36)
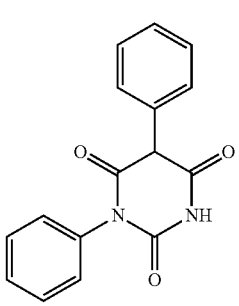 (A-37)
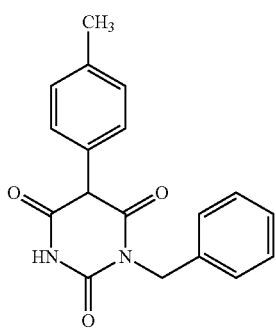 (A-38)
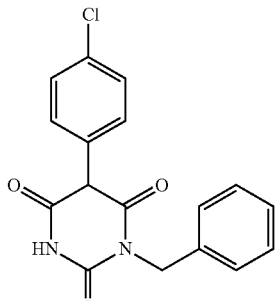 (A-39)
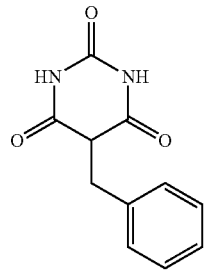 (A-40)

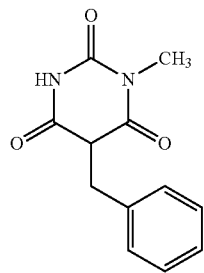
(A-41)
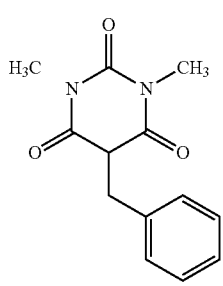
(A-42)
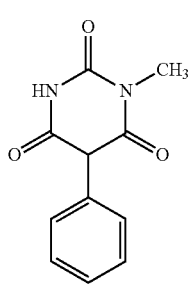
(A-43)
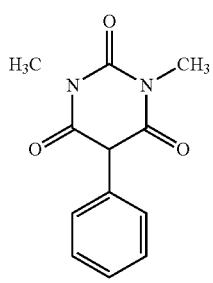
(A-44)
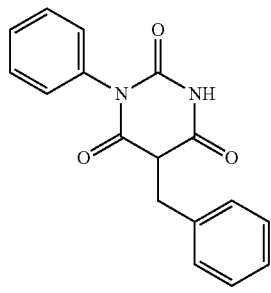
(A-45)
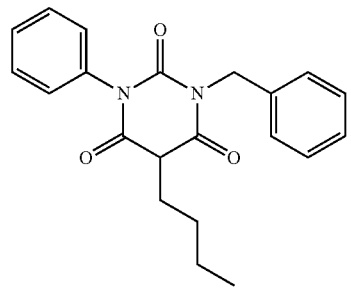
(A-46)
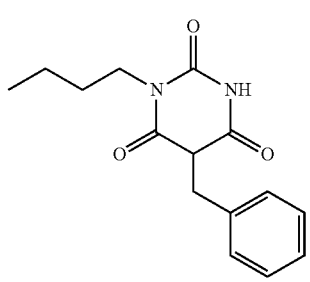
(A-47)
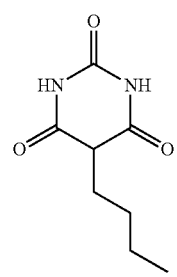
(A-48)
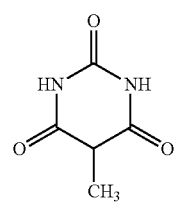
(A-49)
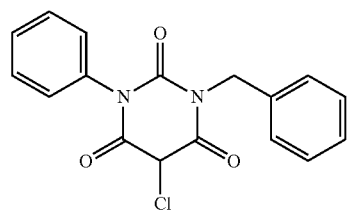
(A-50)
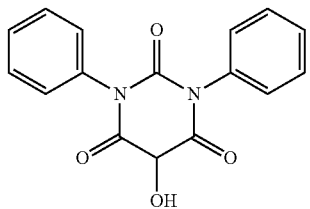
(A-51)

(A-52)
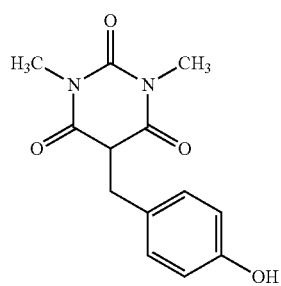
(A-53)
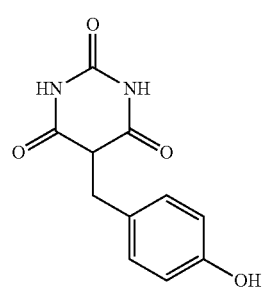
(A-54)
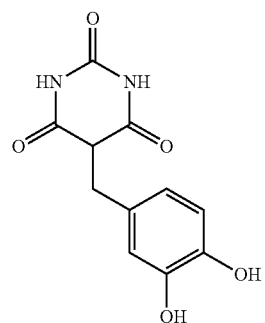
(A-55)
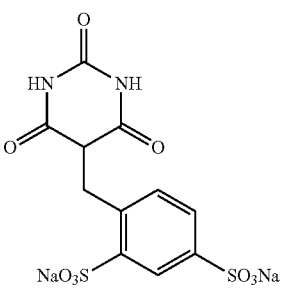
(A-56)
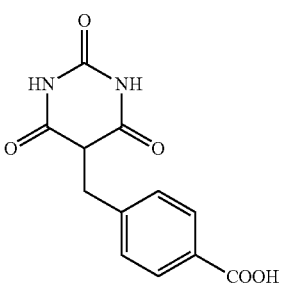
(A57)
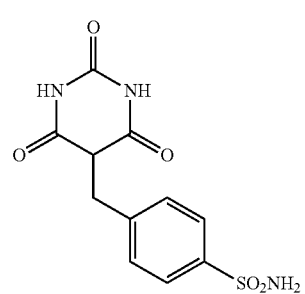
(A-58)
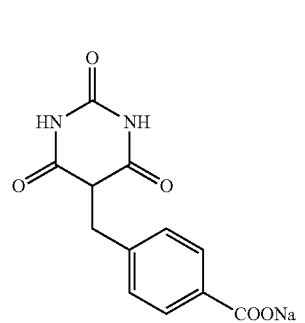
(A-59)
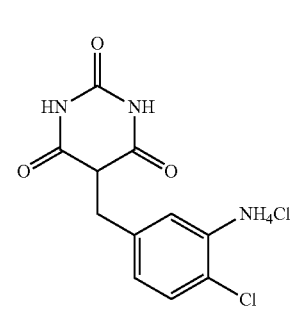
(A-60)
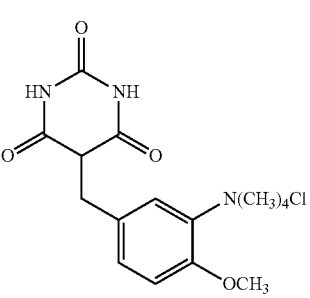
(A-61)
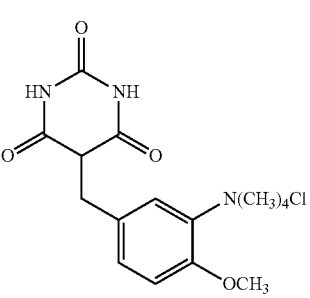

(A-62)
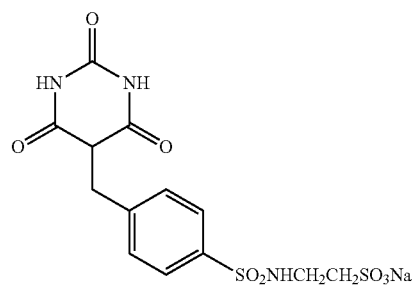
(A-63)
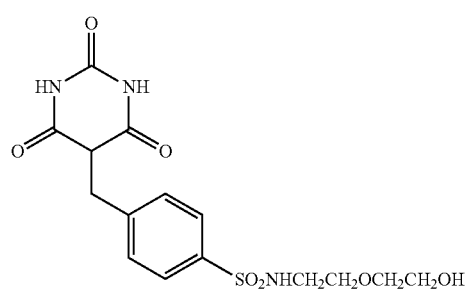
(A-64)
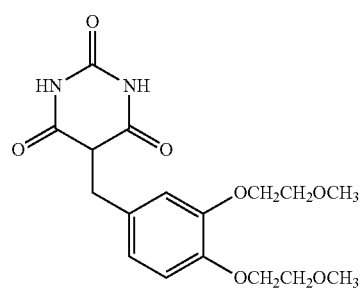
(A-65)
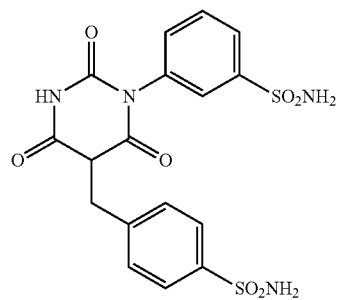
(A-66)
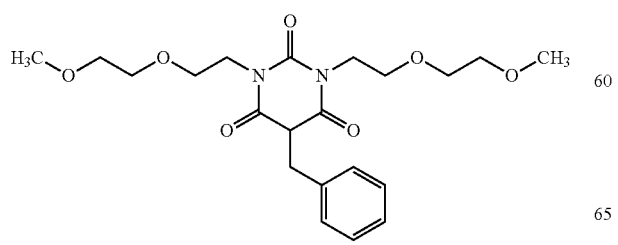
(A-67)
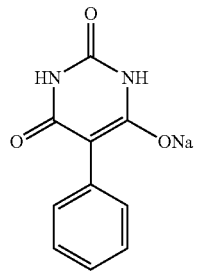
(A-68)
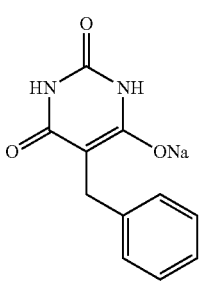
(A-69)
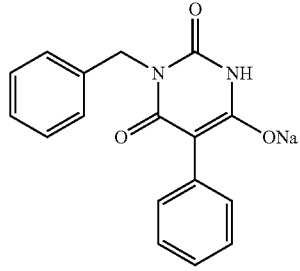
(A-70)
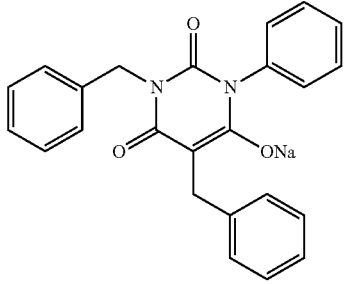
(A-71)
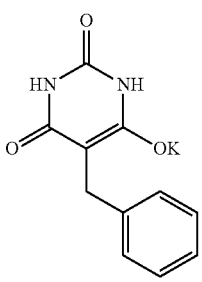

-continued
(A-72)
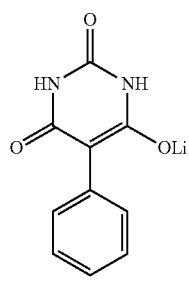
(A-73)
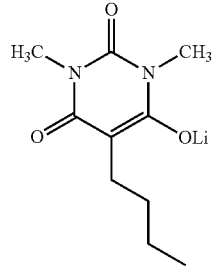
(A-74)
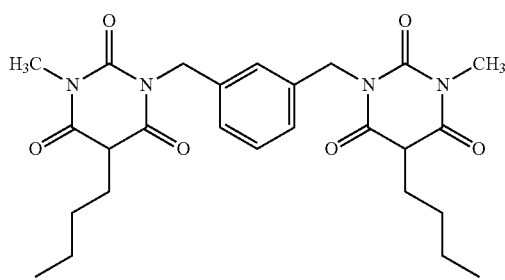
(A-75)
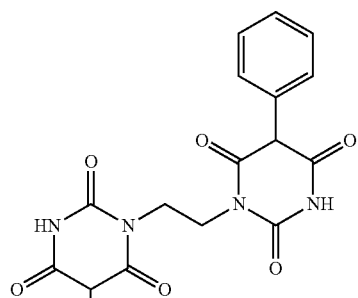
(A-76)
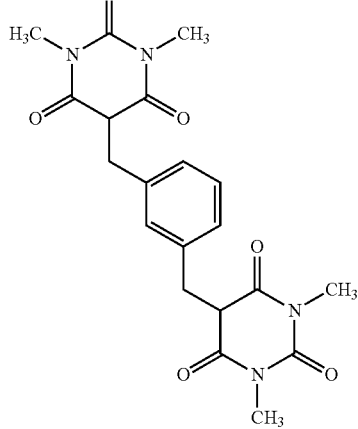
-continued
(A-77)
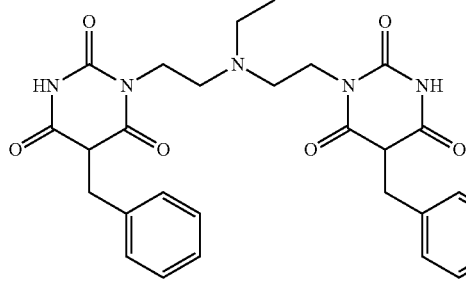
(A-78)
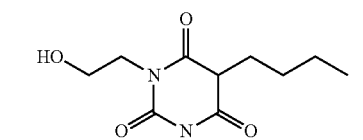
(A-79)
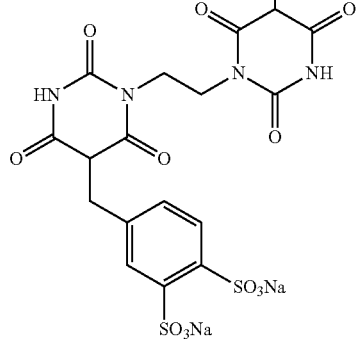

-continued (A-80)

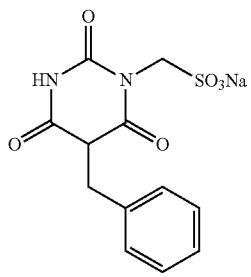

(A-81)

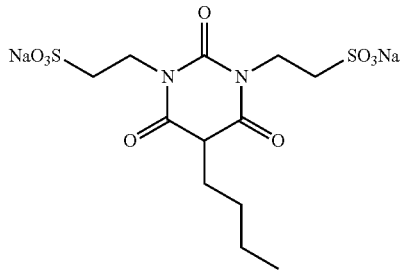

The compound represented by General Formula (1) has a barbituric acid structure, and therefore, can be synthesized through a synthesis method of barbituric acid in which a urea derivative and a malonic acid derivative are condensed. The compound having two substituent groups on a nitrogen atom can be obtained by heating N,N'-disubstituted urea and malonic acid chloride or by combining and heating malonic acid and an activating agent such as acetic anhydride. As the synthesis methods, for example, it is possible to preferably use the methods disclosed in Journal of the American Chemical Society, Vol. 61, p. 1015 (1939), Journal of Medicinal Chemistry, Vol. 54, p. 2409 (2011), Tetrahedron Letters, Vol. 40, p. 8029 (1999), WO2007/150011A, and the like.

In addition, the malonic acid used in condensation may not be substituted or have a substituent group. Moreover, with the use of malonic acid which has a substituent group corresponding to $R^5$, it is possible to synthesize the compound represented by General Formula (1) by constructing the barbituric acid. In addition, when unsubstituted malonic acid and a urea derivative are condensed, it is possible to obtain barbituric acid which is not substituted at the 5-position, and therefore, the compound represented by General Formula (1) may be synthesized by modifying the barbituric acid.

As the modification method at the 5-position, it is possible to use a nucleophilic substitution reaction with halogenated alkyl or an addition reaction such as a Michael addition reaction. In addition, it is possible to preferably use a method of reducing the double bond after dehydrating and condensing an aldehyde or a ketone to produce alkylidene or arylidene compounds. As such methods, for example, it is possible to preferably use the methods disclosed in Organic Letters, Vol. 5, p. 2887 (2003), Journal of Medicinal Chemistry, Vol. 17, p. 1194 (1974), Journal of Organic Chemistry, Vol. 68, p. 4684 (2003), Tetrahedron Letters, Vol. 42, p. 4103 (2001), Journal of the American Chemical Society, Vol. 119, p. 12849 (1997), Tetrahedron Letters, Vol. 28, p. 4173 (1987), and the like.

The method of synthesizing the compound represented by General Formula (1) is not limited to the above-described methods.

Hereinafter, another specific embodiment of the compound having polyiodide ion $I_5^-$ formation capability will be described, but the present invention is not limited to the following specific embodiment.

(Compound Represented by General Formula (I))

General Formula (1)

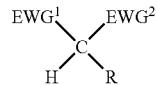

In General Formula (I), R represents a substituent group, but is not a group including a phenolic hydroxyl group or an aromatic amino group. $EWG^1$ and $EWG^2$ each independently represent an electron withdrawing group. $EWG^1$ and $EWG^2$ may be bonded to each other to form a ring. However, there is no case where $EWG^1$ and $EWG^2$ are bonded to each other to become the following linking group which is then bonded to a carbon atom in which R is substituted to form a ring.

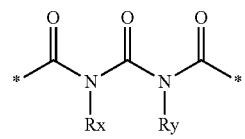

Here, Rx and Ry each independently represent a hydrogen atom or a substituent group. * represents a position at which the linking group is bonded to a carbon atom in which R is substituted. In addition, $EWG^1$ and R or $EWG^2$ and R may be bonded to each other to form a ring.

Here, as the electron withdrawing group in $EWG^1$ and $EWG^2$, a group of which a σp value of Hammett's rule is greater than 0 is preferable. Examples of substituent groups whose σp value is positive include halogen atoms such as fluorine (0.06), chlorine (0.30), bromine (0.27), iodine (0.30); groups having carbonyl such as —CHO (0.22), —COCH₃ (0.50), —COC₆H₅ (0.46), —CONH₂ (0.36), —COO⁻(0.30), —COOH (0.41), —COOCH₃ (0.39), and —COOC₂H₅ (0.45); groups having sulfonyl or sulfinyl such as —SOCH₃ (0.49), —SO₂CH₃ (0.72), —SO₂C₆H₅ (0.68), —SO₂CF₃ (0.93), —SO₂NH₂ (0.57), —SO₂OC₆H₅ (0.23), —SO₃⁻(0.09), and —SO₃H (0.50); nitrogen-containing substituent groups such as —CN (0.66), —NO₂ (0.78), —N(CH₃)₃⁺ (0.82), and —N (CF₃)₂ (0.53); and halogen atom-substituted alkyl groups such as —CCl₃ (0.46), —CH₂Cl (0.18), —CHCl₂ (0.32), and —CF₃ (0.54). Here, the values in parentheses are σp values.

The σp value of Hammett is disclosed also in, for example, C. Harsch et. al., J. Med. Chem., 16, 1207 (1973), C. Harsch et. al., J. Med. Chem., 20, 304 (1977), and Chem. Rev. 91, 165 (1991).

The σp value of Hammett of the electron withdrawing group in $EWG^1$ and $EWG^2$ is preferably greater than or equal to 0.20. Specific examples of the electron withdrawing group preferably include an acyl group, an alkoxycarbonyl group, an aryloxycarbonyl group, an alkyl or aryl carbamoyl group (for example, —CONHCH₃ (0.32)); a thioacyl group, an alkoxythiocarbonyl group, an aryloxy thiocarbonyl group, an alkyl or aryl thiocarbamoyl group (for example, —CSNHCH₃ (0.34)); an alkyl or aryl sulfamoyl group (for example, —SO₂N (CH₃)₂ (0.65)); an alkyl or aryl sulfonyl group (for example, —SO₂CH₃ (0.72), —SO₂C₆H₅ (0.68)), an alkyl or aryl sulfinyl group (for example, —SOCH₃ (0.49)); a cyano group; a nitro group; or a phosphono group. More preferred examples thereof include an acyl group, an alkoxycarbonyl group, an aryloxycarbonyl group, an alkyl or aryl carbamoyl group, an alkyl or aryl sulfamoyl group, an alkyl or aryl sulfonyl group, an alkyl or aryl sulfinyl group, a cyano group, a nitro group, or a phosphono group.

The acyl group may be an aromatic acyl group or an aliphatic acyl group, and also includes a formyl group, in which the number of carbon atoms is preferably 1 to 20 and more preferably 2 to 10.

Examples of the acyl group include formyl, acetyl, propionyl, isobutyryl, pivaloyl, lauroyl, myristoyl, acryloyl, methacryloyl, benzoyl, and naphthoyl.

In the acyl group, a branched alkyl (preferably a tert-alkylcarbonyl group) acyl group, for example, pivaloyl, or a phenylcarbonyl group which has a substituent group at the ortho position, is preferable.

The number of carbon atoms of the alkoxycarbonyl group is preferably 2 to 20 and more preferably 2 to 10. As the alkoxycarbonyl group, a branched alkoxycarbonyl group is preferable and tert-alkyloxycarbonyl group is more preferable. Examples of the alkoxycarbonyl group include methoxycarbonyl, ethoxycarbonyl, isopropoxycarbonyl, tert-butyloxycarbonyl, n-octyloxycarbonyl, and dodecyloxycarbonyl.

The number of carbon atoms of the aryloxycarbonyl group is preferably 7 to 20 and more preferably 7 to 16. Examples of the aryloxycarbonyl group include phenyloxycarbonyl and naphthyloxycarbonyl.

The alkoxycarbonyl group is preferable to the aryloxycarbonyl group.

The thiocarbamoyl group in which at least one of hydrogen atoms is substituted with a group independently selected from alkyl groups or aryl groups preferably has 1 to 20 carbon atoms and more preferably 1 to 10 carbon atoms.

Examples of the carbamoyl group include carbamoyl, N-methylcarbamoyl, N,N-dimethylcarbamoyl, N-phenylcarbamoyl, N,N-diphenylcarbamoyl, and N-methyl-N-phenylcarbamoyl.

The alkyl or aryl sulfonyl group preferably has 1 to 20 carbon atoms and more preferably 1 to 10 carbon atoms.

Examples of the sulfonyl group include methylsulfonyl, isopropylsulfonyl, tert-butylsulfonyl, tert-octylsulfonyl, and phenylsulfonyl.

The alkyl or aryl sulfonyl group preferably has 1 to 20 carbon atoms and more preferably 1 to 10 carbon atoms.

Examples of the sulfinyl group include methylsulfinyl, isopropyl sulfinyl, tert-butylsulfinyl, tert-octylsulfinyl, and phenylsulfinyl.

The phosphono group is represented by —P(=O)(ORb)₂ and Rb represents a substituent group. Preferred substituent group Rb will be described later.

Examples thereof include a thioacyl group, an alkoxy thiocarbonyl group, an aryloxy thiocarbonyl group, and a thiocarbamoyl group in which at least one of hydrogen atoms is substituted with a group independently selected from alkyl groups or aryl groups (and preferred ranges and specific examples thereof are different only in that the C(=O) moieties of corresponding groups including an acyl group, an alkoxy carbonyl group, an aryloxy carbonyl group, and a thiocarbamoyl group in which at least one of hydrogen atoms is substituted with a group independently selected from alkyl groups or aryl groups are substituted with (C=S)).

In a case where $EWG^1$ and $EWG^2$ are bonded to each other to form a ring, the moiety which is bonded to a carbon atom to which R is bonded is preferably —C(=O)—, —C(=S)—, —SO₂—, —SO—, or *—P(=O)(ORb)O—. Here, * represents a position at which a linking group is bonded to a carbon atom to which R is bonded, and Rb represents a substituent group. In this case, —C(=O)— and —C(=S)— are more preferable, —C(=O)— and —C(=O)— or —C(=S)— are still more preferable, and —C(=O)— is particularly preferable.

Examples of the substituent groups in R, Rx, and Ry include the following substituent groups S.

However, R is not a group including a phenolic hydroxyl group or an aromatic amino group in substituent groups and is not a group including —NH₂ therein.

Substituent groups S: examples of the substituent groups S include alkyl groups (preferably with 1 to 20 carbon atoms, for example, methyl, ethyl, isopropyl, tert-butyl, pentyl, heptyl, 1-ethylpentyl, 2-ethylhexyl, benzyl, 2-ethoxyethyl, and 1-carboxymethyl); alkenyl groups (preferably with 2 to 20 carbon atoms, for example, vinyl, allyl, and oleyl); alkynyl groups (preferably with 2 to 20 carbon atoms, for example, ethynyl, butadiynyl, and phenylethynyl); cycloalkyl groups (preferably with 3 to 20 carbon atoms, for example, cyclopropyl, cyclopentyl, cyclohexyl, and 4-methyl cyclohexyl); aryl groups (preferably with 6 to 20 carbon atoms, for example, phenyl, 1-naphthyl, 4-methoxyphenyl, 2-chlorophenyl, and 3-methylphenyl); heterocyclic groups (heterocyclic groups with 0 to 20 carbon atoms are preferable; a ring-constituting hetero atom is preferably an oxygen atom, a nitrogen atom, and a sulfur atom and may be subjected to ring condensation with a benzene ring or a hetero ring which is a 5- or 6-membered ring; the ring may be a saturated ring, an unsaturated ring, or an aromatic ring; and examples thereof include 2-pyridyl, 4-pyridyl, 2-imidazolyl, 2-benzimidazolyl, 2-thiazolyl, and 2-oxazolyl); alkoxy groups (preferably with 1 to 20 carbon atoms, for example, methoxy, ethoxy, isopropyloxy, and benzyloxy); and aryloxy groups (preferably with 6 to 20 carbon atoms, for example, phenoxy, 1-naphthyloxy, 3-methylphenoxy, and 4-methoxyphenoxy);

alkylthio groups (preferably with 1 to 20 carbon atoms, for example, methylthio, ethylthio, isopropylthio, and benzylthio); arylthio groups (preferably with 6 to 20 carbon atoms, for example, phenylthio, 1-naphthylthio, 3-methylphenylthio, and 4-methoxyphenylthio); acyl groups (which include an alkylcarbonyl group, an alkenylcarbonyl group, an arylcarbonyl group, and a heterocyclic carbonyl group, and preferably have 20 or fewer carbon atoms, and examples thereof include acetyl, pivaloyl, acryloyl, methacryloyl, benzoyl, and nicotinoyl); alkoxycarbonyl groups (preferably with 2 to 20 carbon atoms, for example, ethoxycarbonyl and 2-ethylhexyloxy carbonyl); aryloxycarbonyl groups (preferably with 7 to 20 carbon atoms, for example, phenyloxycarbonyl, and naphthyloxycarbonyl); amino groups (which include an amino group, an alkylamino group, an arylamino group, and a heterocyclic amino group, and preferably have 0 to 20 carbon atoms, and examples thereof include amino, N,N-dimethylamino, N,N-diethylamino, N-ethylamino, anilino, 1-pyrrolidinyl, piperidino, and morpholinyl); alkyl or aryl sulfonamide groups (preferably with 0 to 20 carbon atoms, for example, N,N-dimethyl sulfonamide and N-phenyl sulfonamide); alkyl or aryl sulfamoyl groups (preferably with 0 to 20 carbon atoms, for example, N,N-dimethylsulfamoyl and N-phenylsulfamoyl); acyloxy groups (preferably with 1 to 20 carbon atoms, for example, acetyloxy and benzoyloxy); alkyl or aryl carbamoyl groups (preferably with 1 to 20 carbon atoms, for example, an N,N-dimethylcarbamoyl and N-phenylcarbamoyl); acylamino groups (preferably with 1 to 20 carbon atoms, for example, acetylamino, acryloylamino, benzoylamino, and nicotinamide); cyano groups; hydroxy groups; mercapto groups; and sulfo groups or salts thereof; carboxy groups or salts thereof, phosphate groups or salts thereof; -onio groups (for example, a sulfonio group of a sulfonium salt, an ammonio group of an ammonium salt, an iodonio group of an iodonium salt, and a phosphonio group of a phosphonium salt); thioacyl groups; alkoxythiocarbonyl groups; aryloxy thiocarbonyl groups; alkyl or aryl-thiocarbamoyl groups (and preferred ranges and specific examples thereof are different only in that the C(=O) moieties of corresponding groups including an acyl group, an alkoxy carbonyl group, an aryloxy carbonyl group, and an alkyl or aryl carbamoyl group is substituted with (C=S)); or halogen atoms (for example, a fluorine atom, a chlorine atom, a bromine atom, and an iodine atom).

These substituent groups may be further substituted with substituent groups, and examples of such substituent groups include the above-described substituent groups S.

Examples thereof include an aralkyl group in which an aryl group is substituted with an alkyl group; and a group in which an alkoxycarbonyl group or a cyano group is substituted with an alkyl group.

R is preferably an alkyl group, an alkenyl group, a cycloalkyl group, a cycloalkenyl group, an aryl group, a nitro group, a heterocyclic group or a halogen atom, more preferably an alkyl group, an alkenyl group, a cycloalkyl group, a cycloalkenyl group, an aryl group, a nitro group, or a halogen atom, and still more preferably an alkyl group, an alkenyl group, a cycloalkyl group, a cycloalkenyl group, or an aryl group.

The number of carbon atoms of the alkyl group in R is preferably 1 to 20, more preferably 1 to 10, and still more preferably 1 to 5.

Examples of the alkyl group include a methyl group, an ethyl group, an isopropyl group, an n-butyl group, a tert-butyl group, a 2-ethylhexyl group, an n-octyl group, an n-decyl group, an n-octadecyl group, and an isooctadecyl group.

The number of carbon atoms of alkenyl group in R is preferably 2 to 20, more preferably 2 to 10, and still more preferably 2 to 5.

Examples of the alkenyl group include vinyl, allyl, isopropenyl, 2-pentenyl, and oleyl.

The number of carbon atoms of cycloalkyl group in R is preferably 3 to 20, more preferably 5 to 10, and still more preferably 5 or 6.

Examples of carbon atoms of the cycloalkyl group include cyclopropyl, cyclopentyl, and cyclohexyl.

The number of carbon atoms of cycloalkenyl group in R is preferably 5 to 20, more preferably 5 to 10, and still more preferably 5 or 6.

Examples of the cycloalkenyl group include cyclopentenyl and cyclohexenyl.

The number of carbon atoms of aryl group in R is preferably 6 to 20, more preferably 6 to 10, and still more preferably 6 to 8.

Examples of the aryl group include phenyl and naphthyl.

The number of carbon atoms of heterocyclic group in R is preferably 0 to 20, more preferably 1 to 10, still more preferably 2 to 10, and particularly preferably 2 to 5.

As a hetero ring of the heterocyclic group, a 5- or 6-membered hetero ring is preferable, and the hetero ring may be substituted with a substituent group or may be subjected to ring condensation with a benzene ring, an alicycle, or a hetero ring. Here, examples of the substituent groups include the above-described substituent groups S.

Examples of the hetero atom constituting the hetero ring in the heterocyclic group include a nitrogen atom, an oxygen atom, or a sulfur atom, and may be a heteroaromatic ring or a hetero ring not being an aromatic ring.

Examples of the hetero ring of the heterocyclic group include a thiophene ring, a furan ring, a pyrrole ring, a pyrazole ring, an imidazole ring, a thiazole ring, an oxazole ring, a triazole ring, a tetrazole ring, a pyridine ring, a pyrazine ring, a triazole ring, a pyrrolidine ring, a pyrroline ring, a pyrazolidine ring, a piperidine ring, a piperazine ring, a morpholine ring, a thiomorpholine ring, and rings in which these are subjected to benzene ring condensation (for example, an indole ring and a benzimidazole ring).

Examples of the halogen atoms in R include a fluorine atom, a chlorine atom, and a bromine atom.

Any of $EWG^1$, $EWG^2$, and R in General Formula (I) is preferably a group having at least one ring structure.

Examples of a preferred embodiment of the compound represented by General Formula (1) include a compound represented by the following General Formula (11).

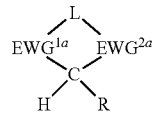

General Formula (II)

In General Formula (II), R has the same meaning as that in General Formula (I), and the preferred range thereof is also the same as that in General Formula (I). $EWG^{1a}$ and $EWG^{2a}$ each independently represent a divalent electron withdrawing group. L represents a single bond or a divalent linking group. Each of these groups may be further substituted with a substituent group.

As the divalent electron withdrawing group in $EWG^{1a}$ and $EWG^{2a}$, —C(=O)—, —SO$_2$—, —SO—, or *—P(=O)(ORb)O— is preferable. Here, * represents a position at which a linking group is bonded to a carbon atom to which R is bonded. Rb represents a substituent group. Examples of the substituent groups include the above-described substituent groups S.

In the divalent linking group in L, the atom of L which is bonded to $EWG^{1a}$ and $EWG^{2a}$ is preferably —C(R$^{X1}$)(R$^{X2}$)—, —N(Ra)—, —O—, —S—, or —N(Ra)—. Here, R$^{X1}$ and R$^{X2}$ each independently represent a hydrogen atom or a substituent group and Ra represents a hydrogen atom or a substituent group.

Examples of the substituent groups in Ra, Rb, R$^{X1}$, and R$^{X2}$ include the above-described substituent groups S.

The substituent group in Ra is preferably an alkyl group, an alkenyl group, a cycloalkyl group, a cycloalkenyl group, an aryl group, and a heterocyclic group, more preferably an alkyl group, a cycloalkyl group, and an aryl group, and still more preferably an alkyl group.

Ra is preferably a hydrogen atom, an alkyl group, a cycloalkyl group, and an aryl group, more preferably a hydrogen atom and an alkyl group, and still more preferably a hydrogen atom.

Rb is preferably an alkyl group, an alkenyl group, a cycloalkyl group, a cycloalkenyl group, an aryl group, and a heterocyclic group, more preferably an alkyl group, a cycloalkyl group, and an aryl group, still more preferably an alkyl group and an aryl group, and particularly preferably an aryl group.

The substituent groups in $R^{X1}$ and $R^{X2}$ are preferably an alkyl group, an alkenyl group, a cycloalkyl group, a cycloalkenyl group, and an aryl group.

$R^{X1}$ and $R^{X2}$ are preferably a hydrogen atom, an alkyl group, an alkenyl group, a cycloalkyl group, a cycloalkenyl group, and an aryl group.

The rings formed by $EWG^{1a}$, $EWG^{2a}$, L are preferably 5- to 8-membered rings, more preferably 5- to 7-membered rings, and still more preferably 5- or 6-membered ring.

Examples of a preferred embodiment of the compound represented by General Formula (II) include a compound represented by the following General Formula (III).

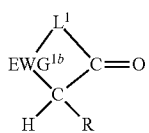

General Formula (III)

In General Formula (III), R has the same meaning as that in General Formula (I), and the preferred range thereof is also the same as that in General Formula (T). $EWG^{1b}$ represents —C(=O)—, —SO$_2$—, —SO—, or *—P(=O)(ORb)O—. Here, * represents a position at which a linking group is bonded to a carbon atom with which R is substituted, and Rb represents a substituent group. $L^1$ represents a divalent linking group. Each of these groups may be further substituted with a substituent group.

$EWG^{1b}$ is preferably —C(=O)—, —SO$_2$—, and —SO—, more preferably —C(=O)— and —SO$_2$—, and still more preferably —C(=O)—.

In the divalent linking group in $L^1$, the atom of $L^1$ which is bonded to $EWG^{1b}$ and —C(O)— is preferably —C($R^{X1}$)($R^{X2}$)—, —N(Ra)—, —S—, and —N(Ra)—. Here, $R^{X1}$ and $R^{X2}$ each independently represent a hydrogen atom or a substituent group and Ra represents a hydrogen atom or a substituent group.

$L^1$ has the same meaning as that in the divalent linking group in L in General Formula (II), and the preferred range thereof is also the same as that in General Formula (II).

As the divalent linking group in L and $L^1$, —O—, —S—, —N(Ra)—, —C(=O)—, —C(=S)—, —SO$_2$—, —SO—, an alkylene group, an alkenylene group, a cycloalkylene group, a cycloalkenylene group, an arylene group, and a divalent heterocyclic group are preferable. The number of carbon atoms of the alkylene group is preferably 1 to 3, and examples thereof include methylene, ethylene, and propylene. The number of carbon atoms of the alkenylene group is preferably 2 or 3, and examples thereof include ethenylene. The number of carbon atoms of the cycloalkylene group is preferably 5 to 12, and examples thereof include cyclopentylene and cyclohexylene. The number of carbon atoms of the cycloalkenylene group is preferably 5 to 12, and examples thereof include cyclopentenylene and cyclohexenylene. The number of carbon atoms of the arylene group is preferably 6 to 12, and examples thereof include phenylene and naphthylene. The hetero atom constituting the hetero ring in the divalent heterocyclic group is preferably an oxygen atom, a sulfur atom, and a nitrogen atom, and the number of carbon atoms is preferably 1 to 12, more preferably 2 to 12, and still more preferably 3 to 12. Examples thereof include a furan ring, a thiophene ring, a pyrrole ring, a pyrazole ring, an imidazole ring, an oxazole ring, a thiazole ring, a pyridine ring, a pyrrolidine ring, a piperazine ring, and a morpholine ring.

A cycloalkylene group, a cycloalkenylene group, an arylene group, and a divalent heterocyclic group which have two adjacent atoms in an ortho position relationship are preferable.

—N(Ra)— has the same meaning as that described above, and the preferred range thereof is also the same as that described above.

L is preferably a single bond, —O—, —S—, —N(Ra)—, —C(=O)—, —C(=S)—, —SO$_2$—, —SO—, an alkylene group, an alkenylene group, a cycloalkylene group, a cycloalkenylene group, or an arylene group.

$L^1$ is preferably —O—, —S—, —N(Ra)—, —C(=O)—, —C(=S)—, —SO$_2$—, —SO—, an alkylene group, an alkenylene group, a cycloalkylene group, a cycloalkenylene group, or an arylene group.

The rings formed by carbon atoms with which $EWG^{1b}$, $L^1$, and R are substituted are preferably 5- to 8-membered rings, more preferably 5- to 7-membered rings, and still more preferably 5- or 6-membered ring.

Examples of a more preferred embodiment of the compound represented by General Formula (1) include a compound represented by the following General Formula (IV).

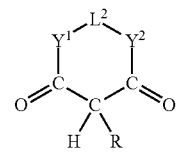

General Formula (IV)

In General Formula (IV), R has the same meaning as that in General Formula (I), and the preferred range thereof is also the same as that in General Formula (I). $Y^1$ and $Y^2$ each independently represent —C($R^{X1}$)($R^{X2}$)—, —N(Ra)—, —O—, —S—, or —N(Ra)—. Here $R^{X1}$ and $R^{X2}$ each independently represent a hydrogen atom or a substituent group and Ra represents a hydrogen atom or a substituent group. $L^2$ represents a single bond or a divalent linking group in which $Y^1$ and $Y^2$ are bonded to each other with 1 to 3 atoms. $Y^1$ and $Y^2$, $Y^1$ and $L^2$, or $Y^2$ and $L^2$ may be bonded to each other to form a ring. Each of these groups may be further substituted with a substituent group.

$L^2$ represents a single bond or a divalent linking group in which $Y^1$ and $Y^2$ are bonded to each other with 1 to 3 atoms. $R^{X1}$, $R^{X2}$, and Ra have the same meaning as those in General Formula (II), and the preferred ranges thereof are also the same as those in General Formula (II).

Examples of $L^2$ include the divalent linking group in which $Y^1$ and $Y^2$ are bonded to each other with 1 to 3 atoms, among the linking groups which are exemplified as the divalent linking groups in $L^1$, and the divalent linking groups as the preferred examples in $L^1$ are preferable as groups satisfying the above.

Accordingly, the alkylene group or the arylene group in $L^2$ has the same meaning as that in $L^1$, and preferred ranges thereof are also the same as those in $L^1$.

$L^2$ is preferably a single bond, an alkylene group, a cycloalkylene group, or an arylene group.

Any of R, $Y^1$, $Y^2$, and $L^2$ in General Formula (IV) is preferably a group which has at least one ring structure.

and Due to excellent compatibility with polyvinyl alcohol-based resin constituting the polarizer layer, the compound represented by General Formula (I) includes a water-soluble functional group is also preferable. The water-soluble functional group is a group contributing to water solubility of the compound represented by General Formula (I). Examples of the water-soluble functional group which is possessed by the compound represented by General Formula (I) include water-soluble groups such as a hydroxy group, a carboxy group or a salt thereof, a sulfo group or a salt thereof, and a phosphate group or a salt thereof, and a group which has an ether bond.

The molecular weight of a compound when the compound represented by General Formula (I) is added to a polarizing plate protective film is preferably within a range of 350 to 1500.

The molecular weight of a compound when the compound represented by General Formula (I) is added to an adhesive layer or a polarizer layer is preferably within a range of 100 to 1000. The C Log P value of the compound represented by General Formula (I) is preferably within a range of −8.0 to 12.0, more preferably within a range of −5.0 to 10.0, and still more preferably within a range of −5.0 to 8.0.

The details of the estimation program of the C Log P value is as described above.

In addition, the compound represented by General Formula (I) which has a preferred molecular weight or C Log P value is preferably selected depending on properties of a resin, in particular, on whether the resin is hydrophilic or hydrophobic, the resin being contained in the same layer as the compound represented by General Formula (I).

For example, in the case of a hydrophobic resin such as a cellulose ester-based resin, a polyester-based resin such as polyethylene terephthalate, a cycloolefin-based resin, and an acrylic resin, the molecular weight of the compound represented by General Formula (I) is preferably within a range of 350 to 1500, more preferably within a range of 400 to 1000, and still more preferably within a range of 400 to 750. In addition, C Log P is preferably within a range of 1.0 to 9.0, more preferably within a range of 2.0 to 9.0, and still more preferably within a range of 2.0 to 8.0.

In contrast, in the case of a hydrophilic resin and a water-soluble resin, such as polyvinyl alcohol or an acylated or ketalated body thereof, the molecular weight of the compound represented by General Formula (I) is preferably within a range of 100 to 1000, more preferably within a range of 140 to 800, and still more preferably within a range of 140 to 600. In addition, C Log P is preferably within a range of −4.0 to 1.0, more preferably within a range of −4.0 to 0.5, and still more preferably within a range of −4.0 to 0. A compound with high solubility in water is more preferable as the compound represented by General Formula (I) in view of compatibility with the hydrophilic resin and the water-soluble resin. Specifically, 0.1 g or more of the compound is preferably dissolved in 100 mL of water at 25° C., 1.0 g or more of the compound is more preferably dissolved therein, and 1.0 g to 0.0 g of the compound is still more preferably dissolved therein.

Hereinafter, specific examples of the compound represented by General Formula (I) will be shown, but the present invention is not limited thereto.

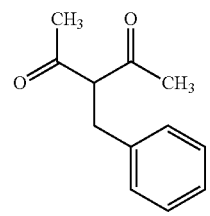

0-1

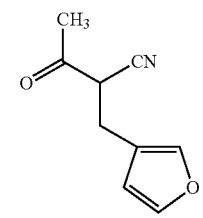

0-2

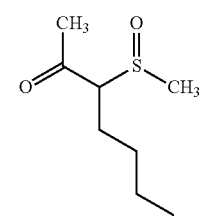

0-3

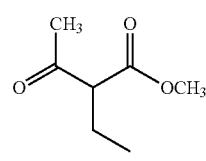

0-4

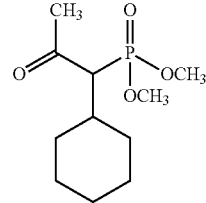

0-5

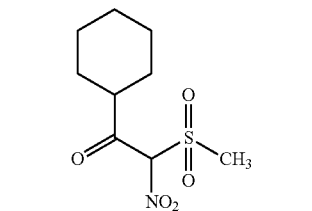

0-6

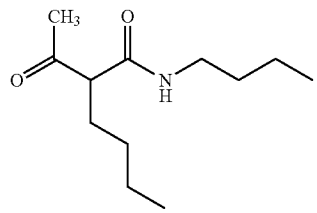

0-7

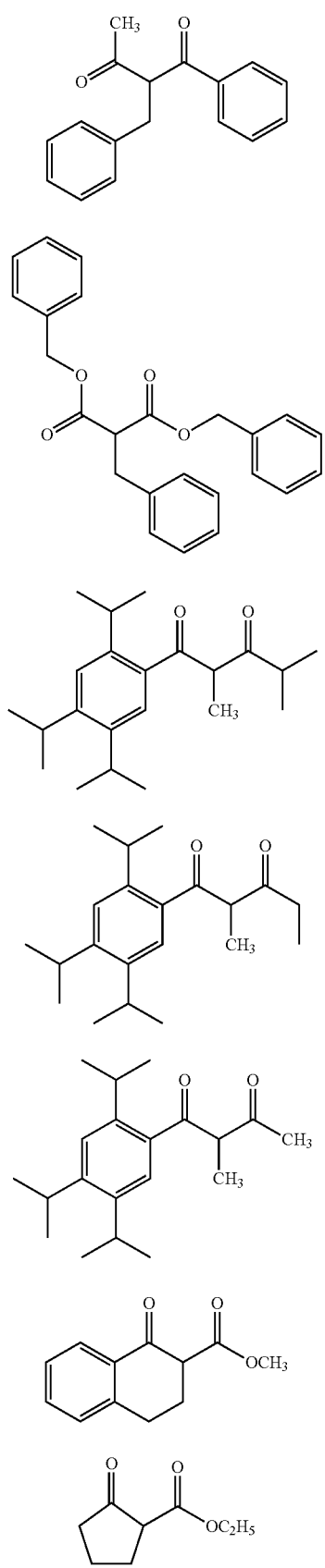
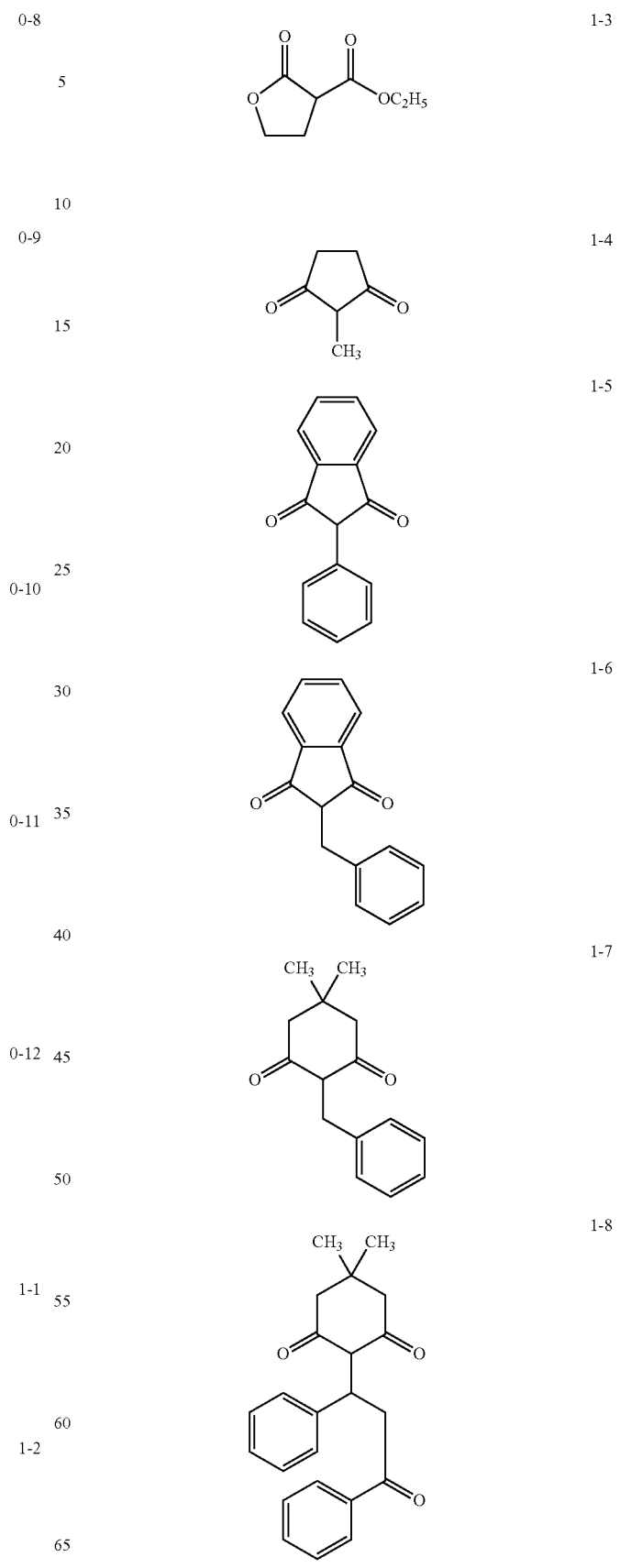

1-9
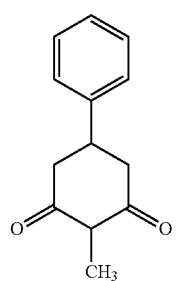
1-10
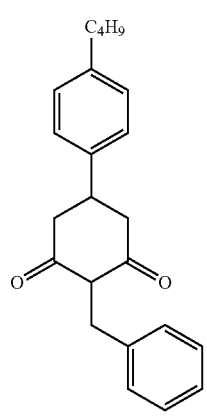
1-11
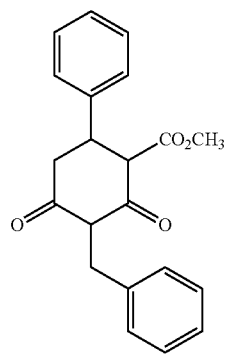
1-12
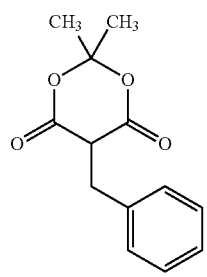
1-13
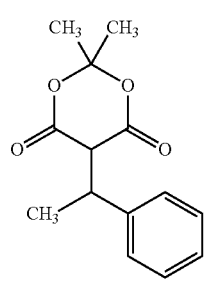
1-14
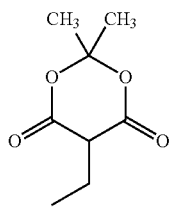
2-1
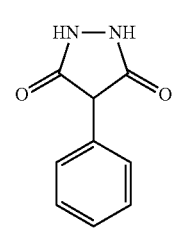
2-2
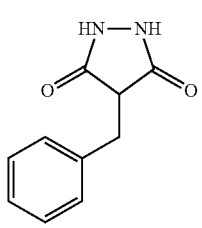
2-3
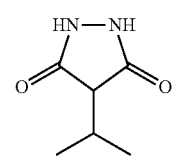
2-4
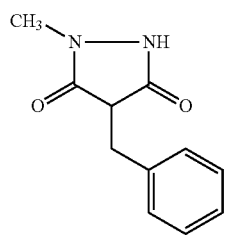
2-5
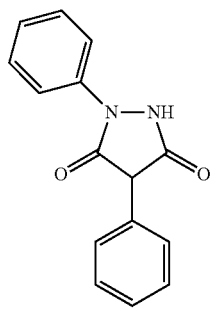

-continued
2-6
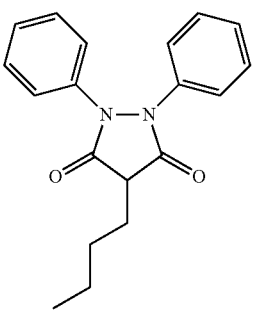
2-7
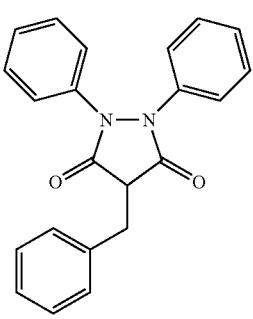
2-8
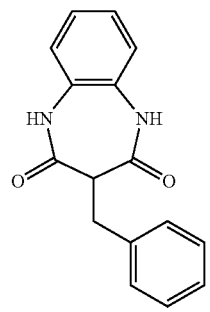
2-9
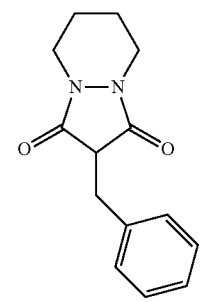
2-10
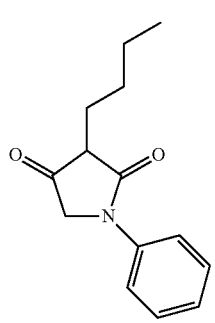
-continued
2-11
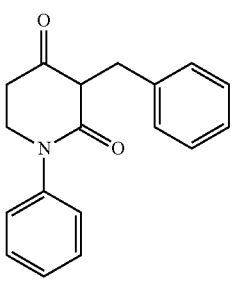
2-12
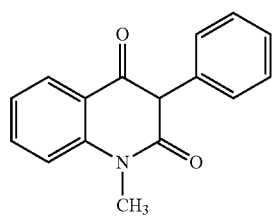
2-13
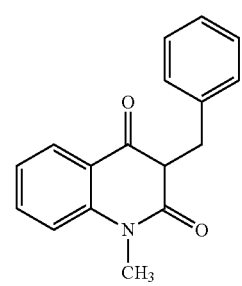
2-14
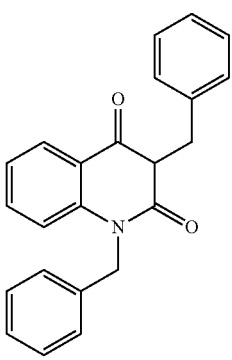
2-15
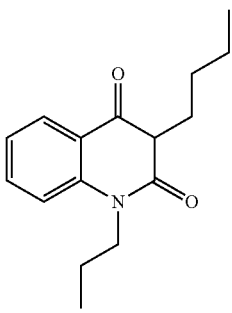

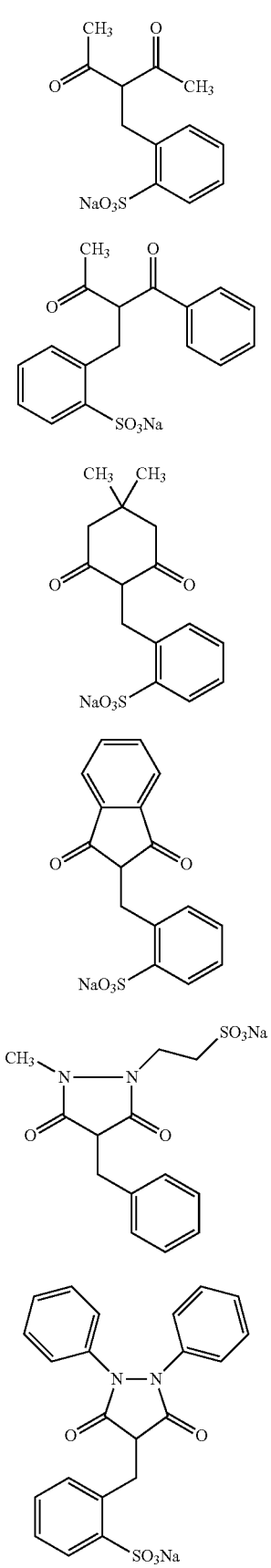
3-1
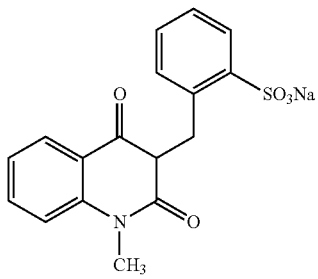
3-2
3-3
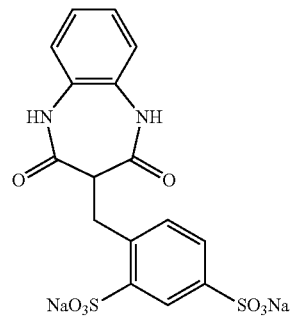
3-4
3-5
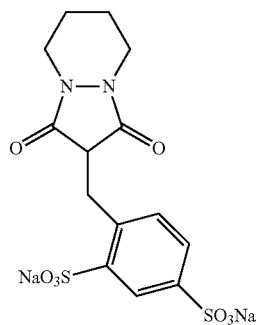
3-6
3-7
3-8
3-9
3-10
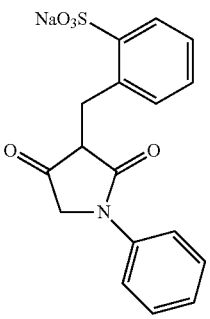
3-11
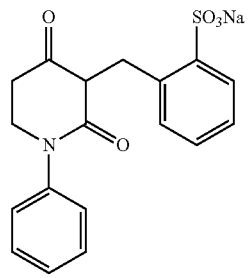
The compound represented by General Formula (I) described above can be synthesized through a well-known method. In addition, the compound is available as a commercial product.

The compound having polyiodide ion $I_5^-$ formation capability may be used alone or two or more kinds thereof may be used in combination. In the case of using two or more kinds of compounds having polyiodide ion $I_5^-$ formation capability in combination, the content of the compounds having polyiodide ion $I_5^-$ formation capability is a total amount of the compounds which have been used in combination.

In an embodiment of applying the compound having polyiodide ion $I_5^-$ formation capability to a polarizer layer, when considering compatibility between the above-described compound and the polyvinyl alcohol-based resin, with respect to 100 parts by mass of the polyvinyl alcohol-based resin, the content of the compound is preferably within a range of 0.01 parts by mass to 30 parts by mass, more preferably within a range of 0.01 parts by mass to 10 parts by mass, and still more preferably within a range of 1 part by mass to 10 parts by mass.

In an embodiment of containing the compound having polyiodide ion $I_5^-$ formation capability in an adhesive layer to be described later, when considering compatibility with the resin, with respect to 100 parts by mass of the resin constituting the adhesive layer, the content of the above-described compound is preferably within a range of 0.01 parts by mass to 30 parts by mass, more preferably within a range of 0.01 parts by mass to 10 parts by mass, and still more preferably within a range of 1 part by mass to 10 parts by mass.

In an embodiment of containing the compound having polyiodide ion $I_5^-$ formation capability in a polarizing plate protective film to be described later, when considering compatibility with the resin, with respect to 100 parts by mass of the resin constituting the polarizing plate protective film, the content of the compound is preferably within a range of 0.01 parts by mass to 30 parts by mass, more preferably within a range of 0.01 parts by mass to 10 parts by mass, and still more preferably within a range of 1.0 part by mass to 10 parts by mass.

<Compound Exhibiting Polyiodide Ion $I_5^-$ Reduction Capability>

Next, the compound having polyiodide ion $I_5^-$ reduction capability will be described.

A polarizing plate A contains a compound having polyiodide ion $I_5^-$ reduction capability in one or more other layers except for a polarizer layer. In contrast, in a polarizing plate B, the compound having polyiodide ion $I_5^-$ reduction capability is contained in or applied to a polyvinyl alcohol-based film before the compound having polyiodide ion $I_5^-$ formation capability is applied thereto.

As the compound having polyiodide ion $I_5^-$ reduction capability, it is possible to select and use a compound having polyiodide ion $I_5^-$ reduction capability, which is measured through the above-described method, from compounds which are generally used as a reducing agent. Examples of such compounds include at least one selected from the group consisting of ascorbic acid, erythorbic acid, chlorogenic acid, citric acid, rosmarinic acid, thiosulfuric acid, sulfurous acid, and salts thereof. In addition, examples of the salts include alkali metal salts such as a sodium salt and a potassium salt. As the compound having polyiodide ion $I_5^-$ reduction capability, a compound exhibiting polyiodide ion $I_5^-$ reduction capability in a state where an inert gas is not passed therethrough in the above-described measurement method is more preferable. In addition, the absorbance ($A_{sample}$) of the compound having polyiodide ion $I_5^-$ reduction capability, at a wavelength of 355 nm, which is measured through the above-described method, and the absorbance ($A_{ref}$) of the reference solution at a wavelength of 355 nm may satisfy $A_{sample} < A_{ref}$, and it is preferable that the greater the difference between $A_{sample}$ and $A_{ref}$, the higher the polyiodide ion $I_5^-$ reduction capability. For example, the value of $A_{sample}$ subtracted from $A_{ref}$ is preferably greater than or equal to 0.5, more preferably greater than or equal to 0.8, and still more preferably greater than or equal to 1.0. The difference is, for example, less than or equal to 1.5, but the upper limit is not particularly limited.

All of the above-described compounds are available as a commercial product and can be synthesized through a well-known method.

The compound having polyiodide ion $I_5^-$ reduction capability may be used alone and two or more kinds thereof may be used in combination. In a case of using two or more kinds of compounds having polyiodide ion $I_5^-$ reduction capability in combination, the content of the compounds having polyiodide ion $I_5^-$ reduction capability is a total amount of the compounds which have been used in combination. When considering compatibility between the above-described compound and the polyvinyl alcohol-based resin, the content of the compound having polyiodide ion $I_5^-$ reduction capability in a polarizer layer with respect to 100 parts by mass of the polyvinyl alcohol-based resin is preferably within a range of 0.01 parts by mass to 30 parts by mass, more preferably within a range of 0.01 parts by mass and 10 parts by mass, and still more preferably within a range of 1 part by mass to 10 parts by mass.

<Method of Producing Polarizing Plate>

Next, specific embodiments of methods of producing polarizing plate A and polarizing plate B will be described. However, the present invention is not limited to the following specific embodiments. Any polarizing plate which is produced through any production method is included in the present invention as long as the polarizing plate contains the compound having polyiodide ion formation capability and the compound having polyiodide ion $I_5^-$ reduction capability in separate layers as described above (polarizing plate A) or can be obtained by separately applying the compounds (polarizing plate B).

<Production of Polarizer Layer>

Both of the polarizing plates A and B contain the compound having polyiodide ion $I_5^-$ reduction capability and have a polarizer layer formed of a polyvinyl alcohol-based film dyed with iodine.

(Preparation of Polyvinyl Alcohol-Based Film Dyed with Iodine)

As the polyvinyl alcohol-based film, a commercial product may be used or a film which is produced through a well-known method may be used. As the method of producing the polyvinyl alcohol-based film, for example, the method disclosed in paragraphs 0213 to 0237 in JP2007-86748A can be used. In addition, it is possible to produce the polyvinyl alcohol-based film referring to JP3342516B, JP1997-328593A (JP-H09-328593A), JP2001-302817A, and JP2002-144401A. The polyvinyl alcohol-based film means a film containing a polyvinyl alcohol-based resin as a resin constituting the film. It is preferable that most of the resin constituting the film, for example, greater than or equal to 80 mass %, is occupied by the polyvinyl alcohol-based resin. All of the resin constituting the film may be the polyvinyl alcohol-based resin. In general, the polyvinyl alcohol-based resin is obtained by saponifying polyvinyl acetate and may contain components, such as unsaturated carboxylic acids, unsaturated sulfonic acids, olefins, and vinyl ethers, which are copolymerizable with vinyl acetate.

In addition, the resin may be a modified polyvinyl alcohol-based resin which contains an acetoacetyl group, a sulfonic acid group, a carboxyl group, an oxyalkylene group, or the like.

In general, the process of producing a polarizer (polarizer layer) formed of the polyvinyl alcohol-based film dyed with iodine includes a dyeing process (iodine dyeing), a crosslinking process, and a stretching process. Furthermore, the process can arbitrarily contain a swelling process, a cleaning process, a drying process, or the like. The above-described processes can be simultaneously or sequentially performed in an arbitrary order.

In general, the stretching process can be performed by implementing uniaxial stretching. The stretching process can be implemented through, for example, a longitudinal uniaxial stretching method which is disclosed in U.S. Pat. No. 2,454,515A, or a tenter method which is disclosed in JP2002-86554A The stretch ratio is preferably 2 times to 12 times and more preferably 3 times to 10 times. In general, the stretching process can be performed through wet-type stretching and may be performed after the swelling process. In addition, the stretching process can be implemented plural times. For example, a film which has been stretched before the dyeing process can be further stretched during the dyeing process or a crosslinking process, or both of the processes.

A treatment liquid (hereinafter, also denoted as a stretching bath) which is used for wet-type stretching can contain an iodide compound. In a case where the iodide compound is contained in the treatment liquid, the concentration of the iodide compound can be set to, for example, 0.1 mass % to 10 mass %, and preferably set to 0.2 mass % to 5 mass %. The liquid temperature of the stretching bath in the wet-type stretching is generally higher than or equal to 25° C., and is preferably within a range of 30° C. to 85° C. and still more preferably within a range of 50° C. to 70° C. The immersion time is generally 10 seconds to 800 seconds and preferably 30 seconds to 500 seconds.

The dyeing process (iodine dyeing) can be performed in a gas phase or a liquid phase. Examples of the dyeing method performed in the liquid phase include a method in which a polyvinyl alcohol-based film is immersed in an iodine-potassium iodide aqueous solution (hereinafter, also denoted as a dyeing bath). As the above-described iodine-potassium iodide aqueous solution, the concentration of iodine is preferably 0.1 g/L to 20 g/L, the concentration of potassium iodide is preferably 1 g/L to 200 g/L, and the mass ratio of iodine to potassium iodide is preferably 1 to 200. The dyeing time is preferably 10 seconds to 5000 seconds, and the liquid temperature of the dyeing bath during dyeing is preferably 5° C. to 60° C. It is possible to use arbitrary means such as coating or spray of a dyeing liquid as well as the immersion as dyeing means. The dyeing process may be performed either before or after the stretching process. In addition, stretching can be performed during the dyeing in a liquid phase. It is preferable that the dyeing is performed in a liquid phase before the stretching process or while performing the stretching in view of the film being appropriately swollen and easily stretched. In a case where the film is stretched plural times, the stretching process is a process in which the stretch ratio is largest among a plurality of processes for performing stretching.

In general, the crosslinking process is performed using a boron compound as a crosslinking agent. The order of the crosslinking process is not particularly limited. The crosslinking process can be performed together with the dyeing process and the stretching process. In addition, the crosslinking process may be performed once or plural times.

Examples of the boron compound include boric acid and sodium borate. In general, the boron compound is used in a form of an aqueous solution or a solution containing a mixed solvent of water and an organic solvent as a solvent. In general, a boric acid aqueous solution is used. The boric acid concentration of the boric acid aqueous solution with respect to 100 parts by mass of the solvent is, for example, within a range of 1 part by mass to 10 parts by mass and preferably within a range of 2 parts by mass to 7 parts by mass. In addition, an iodide compound such as potassium iodide can be contained in the boric acid aqueous solution or the like (hereinafter, also denoted as a crosslinking bath). In a case where the iodide compound is contained in the boric acid aqueous solution, the concentration of the iodide compound with respect to 100 parts by mass of the solvent is, for example, within a range of 0.1 parts by mass to 10 parts by mass and preferably within a range of 0.5 parts by mass to 8 parts by mass. Polyvinyl alcohol can be crosslinked and stabilized by implementing the crosslinking process, which is preferable in view of improvement in polarization performance.

In a case of performing the crosslinking process by immersing a polyvinyl alcohol-based film in the crosslinking bath, the liquid temperature of the crosslinking bath is generally within a range of higher than or equal to 25° C., preferably within a range of 30° C. to 85° C., and still more preferably within a range of 30° C. to 60° C. The immersion time is generally about 5 seconds to 800 seconds and preferably about 8 seconds to 500 seconds.

The swelling process can be performed by immersing a polyvinyl alcohol-based film in a treatment liquid before or after the dyeing process. As the treatment liquid, water, distilled water, and pure water are generally used. It is preferable that the component which occupies most of the treatment liquid is water. A small amount of an iodide compound, an additive such as a surfactant, or an organic solvent such as alcohol may be included in the treatment liquid. In addition, in a case where the iodide compound is contained in the treatment liquid, the concentration of the iodide compound is, for example, 0.1 mass % to 10 mass % and preferably 0.2 mass % to 5 mass %.

In general, the liquid temperature of the treatment liquid in the swelling process is preferably adjusted to about 20° C. to 45° C. and more preferably 25° C. to 40° C. The immersion time in the treatment liquid is generally within a range of 10 seconds to 300 seconds and preferably within a range of 20 seconds to 240 seconds.

The cleaning process can be performed using a potassium iodide solution as a washing liquid. The concentration of the potassium iodide in the potassium iodide solution is generally within a range of 0.5 mass % to 10 mass %, preferably within a range of 0.5 mass % to 8 mass %, and still more preferably within a range of 1 mass % to 6 mass %.

The liquid temperature of the washing liquid is generally 15° C. to 60° C. and preferably 25° C. to 40° C. The immersion time in the washing liquid is generally within a range of 1 second to 120 seconds and preferably within a range of 3 seconds to 90 seconds.

In addition, as the cleaning process, water cleaning may be performed. In general, the water cleaning can be performed by immersing a polyvinyl alcohol-based film in pure water such as ion exchange water or distilled water. The liquid temperature of water used in water cleaning is generally within a range of 5° C. to 50° C., preferably within a range of 10° C. to 45° C., and still more preferably within a range of 15° C. to 40° C. The immersion time in water is generally about 5 seconds to 300 seconds and preferably about 10 seconds to 240 seconds.

The drying process can be finally implemented after the above-described processes are implemented. The drying process can be performed for about 30 seconds to 60 minutes in the atmosphere of 30° C. to 100° C.

In regard to the process of producing a polarizer, paragraphs 0039 to 0050 in JP2011-237580A can be referred to.

(Method of Forming Polarizer Layer Containing Compound Exhibiting Polyiodide Ion $I_5^-$ Reduction Capability)

Examples of the method for containing the above-described compound in a polarizer layer include a method of adding the above-described compound to a film-forming composition which is used for forming a polyvinyl alcohol-based film. In the case of using the above-described method, it is possible to apply well-known arts relating to the production of the polyvinyl alcohol-based film without any restriction except that the point of adding the above-described compound to a film-forming composition.

In addition, another example thereof includes a method of applying the above-described compound to a polyvinyl alcohol-based film at least either before, during, or after the dyeing process. Here, the "application" includes contact of the above-described compound with the polyvinyl alcohol-based film using arbitrary means such as coating, immersion, spray, or the like, and preferably to adsorption or permeation thereof. To do so, for example, it is possible to use the method of adding the above-described compound to a liquid phase such as the stretching bath, the dyeing bath, the crosslinking bath, the treatment liquid, the washing liquid, and the like which are described above. In addition, another example thereof includes a method of coating at least one surface of the polyvinyl alcohol-based film with a solution containing the above-described compound after the dyeing with iodine.

The above-described methods may be singly implemented or two or more thereof may be implemented in combination. In the case of using any of the above-described methods, it is preferable to set the production condition so as to make the polarizer layer contain a desired amount of the compound having polyiodide ion $I_5^-$ reduction capability.

<Process of Applying Compound Exhibiting Polyiodide Ion $I_5^-$ Formation Capability for Producing Polarizing Plate B>

The polarizing plate B has a polarizer layer which is formed by applying a compound having polyiodide ion $I_5^-$ formation capability to a polyvinyl alcohol-based film, dyed with iodine, which contains the compound having polyiodide ion $I_5^-$ reduction capability through any one or more of the above-described methods. The application of the compound having polyiodide ion $I_5^-$ formation capability may be implemented at any time after the compound having polyiodide ion $I_5^-$ reduction capability is included in the film and after the dyeing process. For example, it is possible to add the compound having polyiodide ion $I_5^-$ formation capability to a liquid phase which is used after the dyeing process. In addition, one surface of the polyvinyl alcohol-based film, which contains the compound having polyiodide ion $I_5^-$ reduction capability and is dyed with iodine, may be coated with a solution containing the above-described compound. In the case of using the method of coating the surface of the film with the solution containing the above-described compound, the solvent of a coating liquid is not particularly limited. One kind or two or more kinds of solvents can be mixed in an arbitrary ratio. As the solvent, a solvent, to which the compound having polyiodide ion $I_5^-$ formation capability has high solubility, is preferable, and the solvent may be appropriately selected in accordance with the compound having polyiodide ion $I_5^-$ formation capability. Examples thereof include methyl ethyl ketone, methylene chloride, methanol, methyl acetate, and tetrahydrofuran (THF), but are not limited thereto.

In addition, the concentration of the compound having polyiodide ion $I_5^-$ formation capability in the coating liquid can be set to, for example, about 0.0005 mol/L to 50 mol/L. The coating amount of the coating liquid can be set to, for example, about 1 ml/m² to 60 ml/m².

Hereinabove, the same applies to the case of applying the compound having polyiodide ion $I_5^-$ reduction capability to the film by coating the surface of the film with the compound when producing the polarizing plates A and B.

As described above, in the one speculated mechanism according to the present inventors, it is considered that the compound having polyiodide ion $I_5^-$ formation capability is converted to an oxidatively active compound by reacting with oxygen. It is considered that the reaction between the above-described compound and oxygen which is incorporated into the polarizing plate from the air more easily proceeds in the surface of the polarizer layer or in a part of an region (surface layer region) facing the thickness direction of the polarizer layer from the surface compared to other areas. This is because the surface or the surface layer region is a portion where the reaction between the above-described compound and oxygen, which has reached the polarizer layer passing through a layer adjacent to the polarizer layer, can easily occur. Accordingly, it is preferable that the compound having polyiodide ion $I_5^-$ formation capability exists on the surface of the polarizer layer or in a surface layer region including the surface. Application of the compound by coating the surface of the film therewith is preferable as a method of obtaining a polarizer layer in which the above-described compound exists on the surface or in the surface layer region including the surface.

The surface layer region can be a region, for example, with a thickness of about 1/10 to 1/3 of the film thickness from the surface of the polarizer layer. However, the thickness of the surface layer region is not particularly limited. In addition, the polarizer layer may have a concentration gradient in which the concentration of the compound having polyiodide ion $I_5^-$ formation capability continuously or gradually changes from the inside toward the surface, for example. The polarizer layer may also have a concentration gradient with respect to the compound having polyiodide ion $I_5^-$ reduction capability.

(Method of Forming Adhesive Layer which Contains Compound Exhibiting Polyiodide Ion $I_5^-$ Formation Capability for Producing Polarizing Plate A)

In some cases, an adhesive layer is provided in a polarizing plate as a layer adjacent to a polarizer layer in order to enhance adhesiveness between the polarizer layer and other layers or between the polarizing plate and other members. In such a case, the compound having polyiodide ion $I_5^-$ formation capability can be contained in the adhesive layer.

A resin used in the adhesive layer is not particularly limited, and any well-known resin having an adhesive agent can be used without any restriction. As the adhesive agent, one (agglutinant) with viscosity may be used, or one which exhibits adhesive properties through drying or reaction may be used. The adhesive agent in the present invention means both of the adhesive agent and the agglutinant.

In general, the adhesive layer contains a resin as a component (main component) which occupies most of the adhesive layer. The resin generally occupies, for example, 30 mass % to 90 mass % of the adhesive layer and preferably occupies greater than or equal to 70 mass % of the adhesive layer. The resin may be a mixture in which a plurality of resins are mixed. Examples of the mixture include a mixture of a polymer in which a part of a resin is modified, or a mixture of a component, such as a resin which is obtained by reacting monomers different from each other for synthesis, in which the structure of a main skeleton is almost the same. In the case where the resin is a mixture, the total amount of the mixture is within the above-described range.

The adhesive layer is formed by, for example, coating at least one surface of the polarizer layer or arbitrarily provided other layers (for example, a polarizing plate protective film) with a coating liquid which contains an adhesive agent in a predetermined ratio and by drying the coated surface. Any suitable method can be employed as a method of preparing the coating liquid. As the coating liquid, for example, a commercial solution or dispersing liquid may be used; a solvent may be used by being further added to the commercial solution or dispersing liquid; or a solid content may be used by being dissolved or dispersed in various solvents.

As the adhesive agent, an adhesive agent which has any suitable properties, forms, and adhesive mechanisms depending on the purpose can be used. Specific examples of the adhesive agent include a water-soluble adhesive agent, a ultraviolet ray curable adhesive agent, an emulsion-type adhesive agent, a latex-type adhesive agent, a mastic adhesive agent, a multilayer adhesive agent, a paste adhesive agent, a foaming type adhesive agent, a supported film adhesive agent, a thermoplastic adhesive agent, a thermo-melting type adhesive agent, a thermally solidified adhesive agent, a hot melt adhesive agent, a thermally active adhesive agent, a heat-sealing adhesive agent, a thermosetting adhesive agent, a contact-type adhesive agent, a pressure sensitive adhesive agent, a polymerization-type adhesive agent, a solvent type adhesive agent, and a solvent-activated adhesive agent, and a water-soluble adhesive agent and a ultraviolet ray curable adhesive agent are preferable. A water-soluble adhesive agent is particularly preferably used in view of affinity with the polyvinyl alcohol-based resin for the adhesive layer adjacent to the polarizer layer.

The water-soluble adhesive agent may contain, for example, at least one of a natural polymer or a synthetic polymer which are soluble in water. Examples of the natural polymer include protein or starch. Examples of the synthetic polymer include a resole resin, a urea resin, a melamine resin, polyethylene oxide, polyacrylamide, polyvinyl pyrrolidone, an acrylic acid ester, a methacrylic acid ester, and a polyvinyl alcohol-based resin. Among these, a water-soluble adhesive agent which contains a polyvinyl alcohol-based resin is preferably used. The water-soluble adhesive agent containing a polyvinyl alcohol-based resin is excellent in adhesiveness with a polyvinyl alcohol-based film (polarizer layer), and therefore, is preferably used in the adhesive layer adjacent to the polarizer layer.

When the adhesive layer, which is formed of a water-soluble adhesive agent containing a polyvinyl alcohol-based resin, is adjacent to the polarizer layer, in some cases, the adhesive layer and the polarizer layer are integrated and enter a state where they can be regarded as one layer.

In addition, the adhesive layer can contain a metallic compound and preferably a metallic compound colloid. For the details thereof, paragraphs 0079 to 0083 in JP2012-014148A can be referred to.

Examples of other additives include one kind or two or more kinds of various additives, such as a chain transfer agent, a sensitizer, a tackifier, a thermoplastic resin, a filler, a fluidity controlling agent, a plasticizer, and an antifoaming agent, which are generally used in an adhesive layer of a polarizing plate. In a case of mixing the additives, the amount thereof with respect to a resin (adhesive agent) is preferably less than or equal to 40 mass % and more preferably 0.1 mass % to 30 mass %.

In addition, the adhesive layer may contain a crosslinking agent such as boric acid. It is considered that with the inclusion of boric acid in the adhesive layer, the boric acid is bonded to a hydroxyl group in a resin constituting the adhesive layer and forms a crosslinking structure (boric acid crosslinking), and accordingly, it is possible to enhance adhesiveness between layers, including an interlayer between a polarizer layer and an adhesive layer or an interlayer between an adhesive layer and a polarizing plate protective film which is arbitrarily provided. For example, in general, a saponification treatment or the like is performed on the polarizing plate protective film, and therefore, the polarizing plate protective film has a hydroxyl group on the surface thereof. The polarizing plate protective film formed of a cellulose ester-based resin has a large number of hydroxyl groups on the surface thereof through the saponification treatment. In addition, a polarizing plate protective film which is formed of a polyester-based resin such as polyethylene terephthalate or a cycloolefin-based resin can also have the hydroxyl group on the surface thereof through surface treatments such as a saponification treatment, a corona treatment, or the like. It is possible to promote the boric acid crosslinking between an adhesive layer and a polarizer layer and between an adhesive layer and a polarizing plate protective film by containing the boric acid and a compound having polyiodide ion $I_5^-$ formation capability, most especially the compound represented by General Formula (I), in the adhesive layer adjacent to the polarizing plate protective film which has a hydroxyl group on the surface thereof through the saponification treatment or the like in this manner. Accordingly, it is possible to further enhance adhesiveness between the polarizer layer and the polarizing plate protective film.

In regard to the adhesive layer containing the compound having polyiodide ion $I_5^-$ formation capability, in a case of mixing boric acid, the amount thereof with respect to 100 parts by mass of the compound having polyiodide ion $I_5^-$ formation capability is preferably 0.1 parts by mass to 10000 parts by mass and more preferably 1 part by mass to 1000 parts by mass. It is more preferable that the adhesive layer containing the crosslinking agent and the compound having polyiodide ion $I_5^-$ formation capability as described above is provided as a layer adjacent to a layer formed of a polyvinyl alcohol-based resin and a cellulose ester-based resin which are resins having a large number of hydroxyl groups.

The thickness of the adhesive layer can be appropriately set. Specifically, in a case of using an agglutinant in the adhesive layer, the thickness of the adhesive layer is preferably within a range of 0.1 μm to 50 μm, more preferably within a range of 0.5 μm to 20 μm, still more preferably within a range of 1 μm to 15 μm, and particularly preferably within a range of 5 μm to 10 μm. In contrast, in a case of using an adhesive agent in the adhesive layer, the thickness of the adhesive layer is preferably within a range of 10 nm to 500 nm, more preferably within a range of 10 nm to 400 nm, and still more preferably within a range of 20 nm to 350 nm. The adhesive layer can be formed by coating a polarizer layer or the surface of a polarizing plate protective film which is arbitrarily provided with an adhesive agent or an agglutinant through well-known coating methods such as a spin coating method, a roll coating method, a flow coating method, a dip coating method, and a bar coating method.

The adhesive layer may be directly provided on one surface of the polarizer layer or indirectly provided on the surface thereof through other layers such as a primer layer (also referred to as an easily adhesive layer) or may be provided on both surfaces thereof depending on the form to be used. The adhesive layer can also be formed as a layer which is not adjacent to the polarizer layer, and in this case, a compound having polyiodide ion $I_5^-$ formation capability may be contained in the adhesive layer. In another embodiment, a compound having polyiodide ion $I_5^-$ formation capability can be contained in an adhesive layer adjacent to the polarizer layer.

(Method of Forming Polarizing Plate Protective Film which Contains Compound Having Polyiodide Ion $I_5^-$ Formation Capability for Producing Polarizing Plate A)

The polarizing plate can have one or more polarizing plate protective film. A compound having polyiodide ion $I_5^-$ formation capability may be contained in the polarizing plate protective film.

Examples of raw materials of the polarizing plate protective film include a cellulose ester-based resin, a polycarbonate-based resin, a polyester carbonate-based resin, a polyarylate-based resin, a polysulfone-based resin, a polyethersulfone-based resin, a cycloolefin-based resin such as a norbornene-based resin, a polystyrene-based resin, a polyacrylate-based resin, a poly methacrylate-based resin, a polyester-based resin, an imide-based resin such as an olefin maleimide-based resin, and a glutarimide-based resin, and these can be used alone or in combination. Among the above-described resins, a cellulose ester-based resin, a cycloolefin-based resin, polystyrene-based resin, an imide-based resin, and a poly methacrylate-based resin can be preferably used which have comparatively smaller birefringence due to alignment of molecules and a comparatively smaller photoelastic coefficient. The resin can more preferably occupy 5 mass % to 99 mass % of the polarizing plate protective film, preferably 20 mass % to 99 mass % of the polarizing plate protective film, and still more preferably 50 mass % to 95 mass % of the polarizing plate protective film.

In order to contain a compound having polyiodide ion $I_5^-$ formation capability in the polarizing plate protective film, film formation may be performed by adding the above-described compound to a composition (dope) for forming the polarizing plate protective film. The content of the compound having polyiodide ion $I_5^-$ formation capability in the composition for forming the polarizing plate protective film with respect to 100 parts by mass of a resin constituting the polarizing plate protective film is preferably 0.01 parts by mass to 30 parts by mass, more preferably 0.01 parts by mass to 10 parts by mass, and still more preferably 1.0 parts by mass to 10 parts by mass.

In the polarizing plate protective film containing the compound having polyiodide ion $I_5^-$ formation capability, well-known methods as methods of forming a polarizing plate protective film can be used without any restriction except that the above-described compound is added to the composition for forming a polarizing plate protective film. For example, it is possible to form the polarizing plate protective film containing the compound having polyiodide ion $I_5^-$ formation capability through a melt film forming method or a solution film forming method (solvent cast method).

In regard to the resin constituting the polarizing plate protective film or the additive, and the method of producing the same, JP2005-104149A or paragraphs 0034 to 0040 in JP2012-014148A can be referred to.

As a polarizing plate protective film which does not contain a compound having polyiodide ion $I_5^-$ formation capability, a commercially available or well-known polarizing plate protective film can be used. Examples thereof include a commercially available cellulose triacetate film (Fujitac TD80UF, manufactured by FUJIFILM Corporation); a polymer resin film containing an alicyclic structure disclosed in JP2006-58322A; and an acrylic-based resin film disclosed in JP2009-122644A.

The polarizing plate protective film can be directly provided on the surface of the polarizer layer or indirectly provided on the surface thereof through one or more other layers such as the adhesive layer. In addition, the polarizing plate protective film can be provided on a single surface or both surfaces of the polarizer layer.

In a case where the polarizing plate according to an embodiment of the present invention includes two polarizing plate protective films, the polarizing plate protective films may be the same as or different from each other. The thickness of the polarizing plate protective film is generally 5 μm to 300 μm, preferably 10 μm to 200 μm, more preferably 15 μm to 100 μm, and particularly preferably 15 μm to 60 μm.

<Other Layers which can be Provided in Polarizing Plate>

The polarizing plate according to an embodiment of the present invention can have functional layers such as a retardation layer, an antireflection layer, a hard coat layer, a front scattering layer, and an antiglare (antidazzle) layer in order to enhance visibility or mechanical characteristics of a display. The polarizing plate may be a functionalized polarizing plate in which such functional layers are combined with a film which has a functional layer or a form which is stacked on a polarizing plate protective film, optical films such as an optical compensation film and a luminance enhanced film. In regard to the antireflection film for functionalization, the luminance enhanced film, other functional optical films, the hard coat layer, the front scattering layer, and the antiglare layer, paragraphs 0257 to 0276 in JP2007-86748A can be referred to.

The polarizing plate according to an embodiment of the present invention can be used as a functional optical film which is further provided with functional layers such as a gas barrier layer, a sliding layer, an antistatic layer, an undercoat layer, and a protective layer. These functional layers can be used by being provided on any single surface on the polarizer layer or on a surface (surface further on the air side) opposite to the polarizer layer, or on both of the surfaces. In regard to these functions in which a functional group can be combined in a polarizing plate protective film, JP2005-104149A and paragraphs 0139 to 0160 in JP2012-014148A can be referred to.

<Shape of Polarizing Plate>

As the shape of the polarizing plate, a polarizing plate of an embodiment (for example, an embodiment of a roll length of greater than or equal to 2500 m or greater than or equal to 3900 m) which is produced in an elongated shape through continuous production and is wound up in a roll shape is included as well as a polarizing plate of an embodiment of a film piece which is cut in a size capable of being incorporated in a liquid crystal display device as it is. The width of the polarizing plate is preferably greater than or equal to 1000 mm for a polarizing plate for a large screen liquid crystal display device.

<Performance of Polarizing Plate>

The above-described polarizing plates A and B contain a compound having polyiodide ion $I_5^-$ formation capability and a compound having polyiodide ion $I_5^-$ reduction capability as described above. Accordingly, it is possible to prevent deterioration in polarization performance of the polarizing plates in high temperature and high humidity.

The performance and durability of a polarizing plate can be evaluated through measuring orthogonal transmissivity change of the polarizing plate in a specific environment. The specific measurement method is described below.

(Orthogonal Transmissivity CT)

The orthogonal transmissivity CT at a wavelength of 410 nm is preferably CT≤2.0, more preferably within a range of CT≤1.3, still more preferably CT≤0.6, and still more preferably CT≤0.05 (the unit in all cases being %). The lower the orthogonal transmissivity at a wavelength of 410 nm is, the smaller the light leakage in the vicinity of the wavelength of 410 nm is. In contrast, the higher the orthogonal transmissivity at a wavelength of 410 nm, the larger the light leakage in the vicinity of the wavelength of 410 nm, and therefore, black display of a display exhibits bluish color. Accordingly, it is preferable that the orthogonal transmissivity at a wavelength of 410 nm is low in view of color reproducibility. The above-described low orthogonal transmissivity means that polarization performance is favorable. The orthogonal transmissivity can be measured by, for example, a measurement device used in Example to be described later.

(Amount of Change in Orthogonal Transmissivity)

As the index of evaluating the durability in high temperature and high humidity, it is possible to use the amount of change in the orthogonal transmissivity before and after a polarizing plate is placed over a predetermined period in high temperature and high humidity. For example, the amount of change [change amount=(orthogonal transmissivity (%) after the polarizing plate is left standing)−(orthogonal transmissivity (%) before the polarizing plate is left standing)] in the orthogonal transmissivity at a wavelength of 410 nm when the polarizing plate is left standing for, for example, 336 hours in the environment of a temperature of 80° C. and a relative humidity of 90% is preferably less than or equal to 0.90%, more preferably less than or equal to 0.80%, and still more preferably less than or equal to 0.60% with the change amount being less than or equal to 0. It is more preferable that the change amount is a negative value, that is, orthogonal transmissivity after the polarizing plate is left standing is less than orthogonal transmissivity before the polarizing plate is left standing.

The orthogonal transmissivity described above uses an average value of values measured 10 times. In addition, the amount of change in the orthogonal transmissivity is obtained as a difference in each of the average values which are obtained by performing the measurement 10 times before the still standing and after the still standing described above.

(Other Characteristics)

Optical characteristics which are preferably possessed by a polarizing plate are disclosed in paragraphs 0238 to 0255 in JP2007-086748A. It is preferable that the polarizing plate according to an embodiment of the present invention satisfies these characteristics.

In addition, in an embodiment, the polarizing plates A and B can exhibit characteristics in which there is little fluctuation in the shade (specifically, a b* value indicating yellow shade is low) even after the polarizing plates are temporally used by being incorporated in a liquid crystal display device. Suppression of the fluctuation in the shade of the polarizing plates with time is preferable as it provides a liquid crystal display device excellent in display performance. In regard to this point, the present inventors consider that the fluctuation (generation of yellowing) in the shade in the liquid crystal display device is affected by a complex existing in a comparatively low alignment state in the polarizer layer. The present inventors speculate that it is possible to reduce the amount of such a complex using the above-described compounds, and this is a reason for which it is possible to prevent generation of coloration with time.

<Process of Producing Polarizing Plate>

The polarizing plate can be produced by sticking each of the layers such as a polarizer layer through an adhesive layer as necessary.

When the polarizer layer and the polarizing plate protective film are stuck together, it is preferable to stick them such that a transmission axis of the polarizer layer and a slow axis of the polarizing plate protective film become parallel to each other.

Being parallel and orthogonal which is to be described later includes a range of an error allowable in the technical field to which the present invention belongs. This means that, for example, the range is within a range of less than ±10° from an exact angle with respect to being parallel and orthogonal. The error from the exact angle is preferably less than or equal to 5° and more preferably less than or equal to 3°. The transmission axis of the polarizer layer and the slow axis of the polarizing plate protective film being parallel to each other indicates that any of a direction of a principal refractive index nx of the polarizing plate protective film or a direction of the transmission axis of the polarizing plate is preferably within 5°, more preferably within 1°, and still more preferably within 0.5°. If the deviation of the angle formed by the axes in this manner is within 1° with respect to desired disposition (being orthogonal, parallel, or the like), the polarization performance hardly deteriorates in a cross nicol state of the polarizing plate and, in particular, light leakage hardly occurs, which is preferable.

Examples of constituent members of the polarizing plate include members such as a transparent substrate of a display device such as a liquid crystal cell or an organic EL panel; or a front face plate which is disposed for protecting a display device, in addition to the above-described each of the layers.

[Liquid Crystal Display Device]

Next, the liquid crystal display device according to an embodiment of the present invention will be described.

FIG. 1 is an example of a schematic view showing an example of a liquid crystal display device according to an embodiment of the present invention.

In FIG. 1, a liquid crystal display device 10 is formed of a liquid crystal cell, and an upper-side polarizing plate 1 and a lower-side polarizing plate 8 which are disposed on both sides of the liquid crystal cell. The liquid crystal cell has a liquid crystal layer 5, and an upper electrode substrate 3 and a lower electrode substrate 6 which are disposed above and below the liquid crystal layer 5. An absorption axis 2 of the upper-side polarizing plate 1 of the liquid crystal cell and an absorption axis 9 of the lower-side polarizing plate 8 of the liquid crystal cell are orthogonally stacked. A color filter may be disposed between the liquid crystal cell and each of the polarizing plates. In a case of using the liquid crystal display device 10 of a transmission type, a cold cathode or hot cathode fluorescent tube, or backlight, which has a light emitting diode, a field emission element, and an electroluminescent element as light sources, are disposed on its rear face. Alignment control directions 4 and 7 is described in FIG. 1.

In many cases, the upper-side polarizing plate 1 and the lower-side polarizing plate 8 are used in a configuration in which two polarizing plate protective films are stacked so as to interpose a polarizer therebetween. However, the liquid crystal display device 10 may use an optical compensation film in a protective film on the liquid crystal cell of the polarizing plate. Alternately, the polarizer layer and the electrode substrate 3 or 6 may be directly stuck through an adhesive layer without having the protective film.

The liquid crystal display device 10 may be an image direct-view type, an image projection type, and an optical modulation type. As driving modes of the liquid crystal layer 5, it is possible to use any known modes such as a TN mode, a VA mode, a transverse electric field mode including an IPS mode, an OCB mode, and an ECB mode.

Although not illustrated, as other configurations, it is possible to use the polarizing plate according to an embodiment of the present invention as a part of a circular polarizing plate which is disposed for preventing reflection of a self light-emitting element such as a reflective type or semitranslucent liquid crystal display device or an organic EL.

Example

The present invention is further specifically described with reference to the following Example. The material, the reagent, the amount of a substance and the ratio thereof, the operation, and the like which are shown in the following Example can be appropriately changed within a scope not departing from the gist of the present invention. Accordingly, the scope of the present invention is not limited to the following specific example.

1. Synthesis Example of Compound

Synthesis of Exemplary Compound A-4

An exemplary compound A-4 was synthesized through the following scheme.

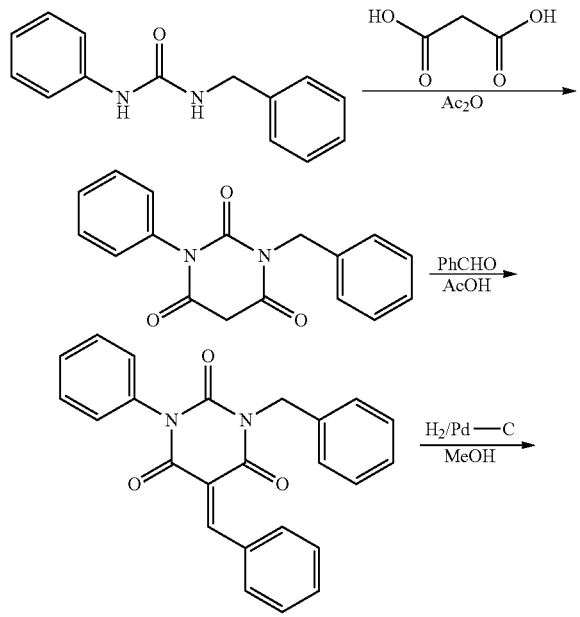

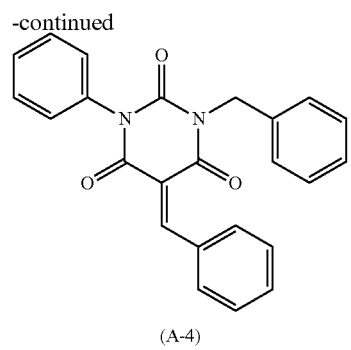

(A-4)

1) Synthesis of Intermediate N-Benzyl-N'-Phenylurea 321 g of benzylamine and 2 L of acetonitrile were put into a 5 L glass flask attached with a thermometer, a reflux cooling tube, and an agitator, and 358 g of phenyl isocyanate was added dropwise at a speed at which the internal temperature of a reaction liquid became lower than or equal to 40° C. while being cooled and stirred in a cold water bath. After stirring it for 2 hours as it was, 2 L of water was added thereto, suction filtration was performed to filter deposited crystals, and then, the resultant was washed with 1 L of water three times. The obtained crystals were dried under reduced pressure at 80° C. to obtain 610 g of intermediate N-benzyl-N'-phenylurea.

2) Synthesis of Intermediate 1-Benzyl-3-Phenylbarbituric Acid 5.0 g of N-benzyl-N'-phenylurea which was synthesized in the above-described 1), 2.5 g of malonic acid, 20 mL of toluene, and 5.6 g of acetic anhydride were put into a 300 mL glass flask attached with a thermometer, a reflux cooling tube, and an agitator, and the mixture was heated such that the internal temperature became 80° C. while stirring the mixture, and then, the mixture was continuously stirred for 3 hours at 80° C. as it was. Thereafter, the mixture was cooled to 50° C., 15 mL of water was added thereto, the mixture was separated, and the water phase was discarded. 5 mL of isopropanol was added dropwise thereto while stirring the organic layer at room temperature. This solution was further stirred for 0.5 hours at a temperature lower than equal to 10° C., and then, deposited crystals were filtered by performing suction filtration. The filtered crystals were washed with cooled isopropanol, and then, dried to obtain 4.6 g of intermediate 1-benzyl-3-phenylbarbituric acid.

3) Synthesis of Intermediate 1-Benzyl-5-Benzylidene-3-Phenylbarbituric Acid 4.0 g of 1-benzyl-3-phenylbarbituric acid which was synthesized in the above-described 2), 1.6 g of benzaldehyde, 40 mL of acetic acid were put into a 300 mL glass flask attached with a thermometer, a reflux cooling tube, and an agitator, and the mixture was heated such that the internal temperature became 100° C. while adding one drop of sulfuric acid and stirring the mixture, and then, the mixture was continuously stirred for 3 hours at 100° C. as it was. Thereafter, the solution was cooled to 50° C., a mixed solution of 39 mL of isopropanol and 17 mL of water was added thereto, the mixture was stirred for 1 hour at a temperature of lower than or equal to 10° C., and then, deposited crystals were filtered by performing suction filtration. The filtered crystals were washed with methanol to obtain 3.9 g of intermediate 1-benzyl-5-benzylidene-3-phenylbarbituric acid.

The structure of the obtained compound was checked through a $^1$H-NMR spectrum.

$^1$H-NMR (300 MHz, CDCl$_3$), δ: 8.70 (s, 1H), 8.10 (d, 2H), 7.58-7.20 (m, 15H), 5.20 (s, 2H)

4) Synthesis of Exemplary Compound A-4

3.5 g of intermediate 1-benzyl-5-benzylidene-3-phenylbarbituric acid which was synthesized in the above-described 3) and 8 mL of methanol were placed into a 50 mL autoclave, H$_2$ was filled therein, and the mixture was heated such that the internal temperature became 50° C. while adding 0.1 g of Pd—C (10%) thereto, and then, the mixture was continuously stirred for 3 hours at 50° C. as it was. Thereafter, Pd—C was filtered and cooled to 5° C. Furthermore, 4 mL of water was added thereto, and deposited crystals were filtered by performing suction filtration after stirring the mixture for 1 hour at 5° C. After washing the filtered crystals using a mixed solvent of methanol/water=1/1, the washed crystals were dried to obtain 3.0 g of exemplary compound A-4.

The structure of the obtained compound was checked through a $^1$H-NMR spectrum, an IR spectrum, and a mass spectrum.

$^1$H-NMR (300 MHz, CDCl$_3$), δ: 7.52-7.16 (m, 10H), 5.10 (s, 2H), 3.86 (s, 2H)

2. Determination of Whether a Compound has Polyiodide Ion $I_5^-$ Formation Capability in Iodide Compound Solution It was determined whether the exemplary compound A-4 has polyiodide ion $I_5^-$ formation capability in an iodide compound (potassium iodide) solution through the above-described method (while setting the standing time of the pressure resistance testing tube in a hot water bath to 2 hours). UV 3100 PC manufactured by Shimadzu Corporation was used as a spectrophotometer.

The absorbance of a reference solution at a wavelength of 355 nm was 0.0 in the measurement, and therefore, an absorbance of a subject compound solution at a wavelength of 355 nm was used for determination. The absorbance of the subject compound solution at a wavelength of 355 nm was 2.1, and therefore, it was determined that the subject compound had polyiodide ion $I_5^-$ formation capability.

3. Determination of Whether a Compound has Polyiodide Ion $I_5^-$ Reduction Capability in Iodide Compound- and Iodine-Containing Solutions It was determined whether ascorbic acid (manufactured by Tokyo Chemical Industry Co., Ltd.) has polyiodide ion $I_5^-$ reduction capability in iodide compound- (potassium iodide-) and iodine-containing solutions through the above-described method (while an inert gas is not passed therethrough). UV 3100 PC manufactured by Shimadzu Corporation was used as a spectrophotometer.

The absorbance of a reference solution at a wavelength of 355 nm was 1.8 and the absorbance of a subject compound (ascorbic acid) solution at a wavelength of 355 nm was 0.6 when measured. Accordingly, it was determined that the ascorbic acid had polyiodide ion $I_5^-$ reduction capability.

4. Example and Comparative Example with Respect to Polarizing Plate

Example 1

Production of Polarizer (Polarizer Layer)

A polyvinyl alcohol-based film (VF-PS 7500 manufactured by Kuraray Co., Ltd.; thickness of 75 μm) was used as a raw film. Each of the following processes was implemented on this polyvinyl alcohol-based film in the following order.

(Swelling Process)

Pure water was used as a treatment liquid of a swelling bath. The above-described polyvinyl alcohol-based film was transported to the swelling bath and was stretched and swollen to 2.2 times while being swollen by being immersed in the pure water, of which the temperature was adjusted to 30° C., for 1 minute.

(Dyeing Process)

An iodine dye solution at 30° C. which contained 0.75 mass % of iodine and 5.25 mass % of potassium iodide was used as a treatment liquid of a dyeing bath. The above-described polyvinyl alcohol-based film which was subjected to the above-described swelling treatment was transported to the dyeing bath and was stretched such that the stretch ratio becomes 3.3 times with respect to its original length while being immersed in the iodine dye solution, of which the temperature was adjusted to 30° C., for 30 seconds, and then was dyed.

(Crosslinking Process)

A mixed aqueous solution (1) which contained 3 mass % of boric acid and 3 mass % of potassium iodide was used as a treatment liquid of a crosslinking bath. The above-described polyvinyl alcohol-based film which was treated as described above was transported to the crosslinking bath and was stretched such that the stretch ratio becomes 3.6 times with respect to its original length while being immersed in the mixed aqueous solution (1), of which the temperature was adjusted to 30° C., for 30 seconds.

(Stretching Process)

A mixed aqueous solution (2) which contained 4 mass % of boric acid, 5 mass % of potassium iodide, and 0.001 mass % of ascorbic acid was used as a treatment liquid of a stretching bath. The above-described polyvinyl alcohol-based film which was treated as described above was transported to the stretching bath and was stretched such that the stretch ratio becomes 6.0 times with respect to its original length while being immersed in the mixed aqueous solution (2), of which the temperature was adjusted to 60° C., for 60 seconds.

(Cleaning Process)

An aqueous solution containing 3 mass % of potassium iodide was used as a treatment liquid of a cleaning bath. The above-described polyvinyl alcohol-based film which was treated as described above was transported to the cleaning bath and was immersed in the above-described aqueous solution, of which the temperature was adjusted to 30° C., for 10 seconds.

(Drying Process)

Next, water of the polyvinyl alcohol-based film, which was treated as described above, was drained and was dried for 4 minutes in an oven with 60° C. in a state where tension was applied thereto, to obtain a polarizer.

Production of Polarizing Plate Protective Film Containing Exemplary Compound A-4

1) Preparation of Cellulose Acetate Resin

Sulfuric acid (7.8 parts by mass with respect to 100 parts by mass of cellulose) was added as a catalyst, and then, acetic acid was added thereto and an acetylation reaction of the cellulose was performed at 40° C. In addition, aging was performed at 40° C. after the acetylation. Furthermore, a low-molecular weight component of the cellulose acetate was removed by being washed with acetone.

The obtained cellulose acetate had the total degree of acetyl substitution of 2.87 and the polymerization degree of 370.

2) Production of Polarizing Plate Protective Film

The following composition, which used the cellulose acetate prepared as described above, was put into a mixing tank and was stirred, and then, each of the components was dissolved to prepare a cellulose acetate solution.

| Composition of cellulose acetate solution | |
|---|---|
| Cellulose acetate with total degree (B) of acetyl substitution of 2.87 and of polymerization degree of 370 | 100.0 parts by mass |
| Exemplary Compound A-4 | 4.0 parts by mass |
| Methylene chloride (first solvent) | 402.0 parts by mass |
| Methanol (second solvent) | 60.0 parts by mass |

The cellulose acetate solution was cast using a band casting machine and was dried at 100° C. until the residual solvent content became 40%, and then, a film was peeled off. The peeled film was further dried for 20 minutes at an atmospheric temperature of 140° C. The film thickness of the obtained polarizing plate protective film was 60 µm.

3) Production of Polarizing Plate

(a) Saponification Treatment of Polarizing Plate Protective Film

The polarizing plate protective film produced in the above was immersed in 2.3 mol/L of an aqueous solution of sodium hydroxide for 3 minutes at 55° C. The polarizing plate protective film was washed in a flushing bathtub at room temperature and was neutralized using 0.05 mol/L of sulfuric acid at 30° C. The polarizing plate protective film was washed in the flushing bathtub at room temperature again and was dried with hot air at 100° C.

(b) Production of Polarizing Plate

The polarizing plate protective film which was subjected to the saponification treatment in the above-described (a) was pasted to one surface of the polarizer layer which was produced through the above-described method, using a polyvinyl alcohol-based adhesive agent.

A commercially available cellulose triacetate film (Fujitac TD80UF manufactured by FUJIFILM Corporation) was also subjected to the same saponification treatment, and was pasted to a surface of the polarizer layer on a side opposite to the side on which the above-described polarizing plate protective film was pasted, using a polyvinyl alcohol-based adhesive agent.

The polarizer and the polarizing plate protective film which was subjected to the saponification treatment in the above-described (a) were disposed such that a transmission axis of the polarizer and a slow axis of the polarizing plate protective film became parallel to each other. In addition, the polarizer and the above-described commercially available cellulose triacetate film were disposed such that a transmission axis of the polarizer and a slow axis of the above-described commercially available cellulose triacetate film became parallel to each other.

The polarizing plate was prepared in this manner.

Comparative Example 1

A polarizing plate was produced in the same manner as in Example 1 except that the exemplary compound A-4 was not added to the polarizing plate protective film.

5. Measurement of Orthogonal Transmissivity and Amount of Change in Orthogonal Transmissivity Each of polarizing plate samples (about 5 cm×5 cm) of the polarizing plates produced in Example 1 and Comparative Example 1 was produced by pasting the surface of the commercially available cellulose triacetate film to a glass plate through an agglutinant (SK-2057 manufactured by Soken Chemical & Engineering Co., Ltd.).

Each transmissivity of the polarizing plate samples prepared in this manner was measured using an automatic polarizing film measurement device VAP-7070 manufactured by JASCO Corporation at a wavelength within a range of 380 nm to 780 nm, and each transmissivity (orthogonal transmissivity) at a wavelength of 410 nm was obtained as an average value of values measured 10 times. Other details of the measurement are as described above.

Thereafter, each orthogonal transmissivity at a wavelength of 410 nm was measured as an average value of values measured 10 times through the same method after temporally storing each of the polarizing plate samples for 336 hours in the environment of 80° C. and 90% RH of relative humidity.

The change in the orthogonal transmissivity before and after the lapse of time was obtained to be evaluated as durability of the polarizing plates. The relative humidity in the environment without controlling the humidity was within a range of 0% RH to 20% RH.

The results are shown in the following Table 1. It can be determined that the polarizing plate with the amount of change in the orthogonal transmissivity of less than 0.6% which is evaluated through the above-described method has extremely favorable durability in high temperature and high humidity.

TABLE 1

| | | Orthogonal transmissivity | | |
| --- | --- | --- | --- | --- |
| | Presence and absence of exemplary compound A-4 in polarizing plate protective film | Before lapse of time (1) [%] | After time lapse of 500 hours at 60° C. and 90% RH (2) [%] | Amount in change of orthogonal transmissivity (2) − (1) [%] |
| Example 1 | Present | 0.02 | 0.60 | 0.58 |
| Comparative Example 1 | Absent | 0.02 | 0.96 | 0.94 |

From the results shown in Table 1, it can be confirmed that the change in the orthogonal transmissivity in high temperature and high humidity has been suppressed in the polarizing plate in Example 1. It is possible to obtain favorable durability also at wavelengths other than wavelength of 410 nm at which the orthogonal transmissivity was measured, in the polarizing plate in Example 1.

In a liquid crystal display device in which a polarizing plate with low orthogonal transmissivity at a wavelength 410 nm is incorporated, light leakage in the vicinity of the wavelength 410 nm is small and black display of a display is suppressed from exhibiting bluish color. Accordingly, the liquid crystal display can exhibit excellent color reproducibility. That is, incorporating the polarizing plate, which suppresses the change in the orthogonal transmissivity at a wavelength 410 nm in high temperature and high humidity, in a liquid crystal display device provides the liquid crystal display device excellent in color reproducibility even after the lapse of time in high temperature and high humidity.

What is claimed is:

1. A polarizing plate comprising at least:
a polarizer layer containing a polyvinyl alcohol-based film dyed with iodine; and
one or more other layers except for the polarizer layer,
wherein the polarizer layer contains a compound which has polyiodide ion $I_5^-$ reduction capability in iodide compound- and iodine-containing solutions,
wherein at least one of the one or more other layers is a polarizing plate protective film, and
wherein the polarizing plate protective film contains a compound which has polyiodide ion $I_5^-$ formation capability in an iodide compound-containing solution.

2. The polarizing plate according to claim 1,
wherein the compound having the polyiodide ion $I_5^-$ formation capability contains a carbon atom, which bonds to an electron withdrawing group through a single bond and does not bond to any other carbon atom through a double bond.

3. The polarizing plate according to claim 2,
wherein the electron withdrawing group is a carbonyl group.

4. The polarizing plate according to claim 2,
wherein the compound having the polyiodide ion $I_5^-$ formation capability contains one or more hetero atoms.

5. The polarizing plate according to claim 2,
wherein the compound having the polyiodide ion $I_5^-$ formation capability has a ring structure containing the carbon atom.

6. The polarizing plate according to claim 5,
wherein the ring structure is a heterocyclic ring.

7. The polarizing plate according to claim 5,
wherein the ring structure is a 5- or 6-membered ring.

8. The polarizing plate according to claim 6,
wherein the ring structure is a nitrogen-containing heterocyclic ring.

9. The polarizing plate according to claim 1,
wherein the compound having the polyiodide ion $I_5^-$ formation capability contains a carbon atom, which bonds to each of two electron withdrawing groups through a single bond and does not bond to any other carbon atom through a double bond.

10. The polarizing plate according to claim 1,
wherein the compound having the polyiodide ion $I_5^-$ reduction capability is at least one kind selected from the group consisting of ascorbic acid, erythorbic acid, chlorogenic acid, citric acid, rosmarinic acid, thiosulfuric acid, sulfurous acid, and salts thereof.

11. A liquid crystal display device including the polarizing plate according to claim 1.

12. A polarizing plate comprising at least:
a polarizer layer containing a polyvinyl alcohol-based film dyed with iodine,
wherein the polarizer layer contains a compound which has polyiodide ion $I_5^-$ reduction capability in iodide compound- and iodine-containing solutions,
wherein the polyvinyl alcohol based film dyed with iodine is absorbed or permeated with a compound which has polyiodide ion $I_5^-$ formation capability in an iodide compound-containing solution, and
wherein the compound having the polyiodide ion $I_5^-$ formation capability contains a carbon atom, which bonds to each of two electron withdrawing groups through a single bond and do not bond to any other carbon atom through a double bond.

13. The polarizing plate according to claim 12,
wherein the compound having the polyiodide ion $I_5^-$ reduction capability is at least one kind selected from the group consisting of ascorbic acid, erythorbic acid, chlorogenic acid, citric acid, rosmarinic acid, thiosulfuric acid, sulfurous acid, and salts thereof.

14. A liquid crystal display device including the polarizing plate according to claim 12.

15. A polarizing plate comprising at least:
a polarizer layer containing a polyvinyl alcohol-based film dyed with iodine; and
one or more other layers except for the polarizer layer,
wherein the polarizer layer contains a compound which has polyiodide ion $I_5^-$ reduction capability in iodide compound- and iodine-containing solutions,
wherein at least one of the one or more other layers contain a compound which has polyiodide ion $I_5^-$ formation capability in an iodide compound-containing solution, and
wherein the compound having the polyiodide ion $I_5^-$ formation capability contains a carbon atom, which bonds to an electron withdrawing group through a single bond and does not bond to any other carbon atom through a double bond.

16. The polarizing plate according to claim 15,
wherein the compound having the polyiodide ion $I_5^-$ formation capability contains a carbon atom, which bonds to each of two electron withdrawing groups through a single bond and does not bond to any other carbon atom through a double bond.

17. The polarizing plate according to claim 15, wherein the electron withdrawing group is a carbonyl group.

18. The polarizing plate according to claim 15, wherein the compound having the polyiodide ion $I_5^-$ formation capability contains one or more hetero atoms.

19. The polarizing plate according to claim 15, wherein the compound having the polyiodide ion $I_5^-$ formation capability has a ring structure containing the carbon atom.

20. The polarizing plate according to claim 19, wherein the ring structure is a heterocyclic ring.

21. The polarizing plate according to claim 19, wherein the ring structure is a 5- or 6-membered ring.

22. The polarizing plate according to claim 20, wherein the ring structure is a nitrogen-containing heterocyclic ring.

23. The polarizing plate according to claim 15, wherein the compound having the polyiodide ion $I_5^-$ reduction capability is at least one kind selected from the group consisting of ascorbic acid, erythorbic acid, chlorogenic acid, citric acid, rosmarinic acid, thiosulfuric acid, sulfurous acid, and salts thereof.

24. A liquid crystal display device including the polarizing plate according to claim 15.

* * * * *